(12) United States Patent
Henneau

(10) Patent No.: US 12,358,758 B2
(45) Date of Patent: Jul. 15, 2025

(54) DURABLE PNEUMATIC ELEVATOR SYSTEM AND METHODS

(71) Applicant: Inventio AG, Hergiswil (CH)

(72) Inventor: Philippe Henneau, Zurich (CH)

(73) Assignee: INVENTIO AG, Hergiswil (CH)

( * ) Notice: Subject to any disclaimer, the term of this patent is extended or adjusted under 35 U.S.C. 154(b) by 105 days.

(21) Appl. No.: 18/036,843

(22) PCT Filed: Nov. 12, 2021

(86) PCT No.: PCT/EP2021/081527
§ 371 (c)(1),
(2) Date: May 12, 2023

(87) PCT Pub. No.: WO2022/101413
PCT Pub. Date: May 19, 2022

(65) Prior Publication Data
US 2023/0406673 A1 Dec. 21, 2023

(30) Foreign Application Priority Data

Nov. 13, 2020 (EP) .................... 20207456

(51) Int. Cl.
*B66B 9/04* (2006.01)
*B66B 1/24* (2006.01)
(Continued)

(52) U.S. Cl.
CPC .............. *B66B 9/04* (2013.01); *B66B 1/2433* (2013.01); *B66B 5/027* (2013.01); *B66B 1/302* (2013.01)

(58) Field of Classification Search
CPC ......... B66B 9/04; B66B 11/0095; B66B 1/34; B66B 1/302
See application file for complete search history.

(56) References Cited

U.S. PATENT DOCUMENTS 4,434,875 A * 3/1984 Scarzella ................ B66B 5/027
187/290
9,709,075 B2 * 7/2017 Yakuel ...................... B66B 9/04
(Continued)

FOREIGN PATENT DOCUMENTS

DE 102017126905 A1 * 5/2019 ......... B66B 11/0492
EP 0550904 B1 8/1996
(Continued)

OTHER PUBLICATIONS

Machine translation of DE 102017126905 A1 (Madera et al.) (Year: 2019).*
(Continued)

*Primary Examiner* — Anna M Momper
*Assistant Examiner* — Michelle M Mudwilder
(74) *Attorney, Agent, or Firm* — William J. Clemens; Shumaker, Loop & Kendrick, LLP

(57) ABSTRACT

The present disclosure relates to elevator technology. In particular, the present disclosure relates to an elevator system using a novel powering scheme. The present disclosure also relates to an elevator system using a pressurised gas to power at least a part of the elevator system. Accordingly, there is provided an elevator system, comprising an elevator car and an elevator drive adapted to move the elevator car in an elevator shaft, wherein the elevator system further comprises a gas reservoir, wherein the gas reservoir is adapted for storing of a pressurized gas, wherein the gas reservoir is connected to an element of the elevator system for powering at least a part of the elevator system. Further, there is provided a method of operating the elevator system and for modernizing an elevator system.

14 Claims, 10 Drawing Sheets

(51) Int. Cl.
B66B 1/30 (2006.01)
B66B 5/02 (2006.01)

(56) References Cited

U.S. PATENT DOCUMENTS

| | | | |
|---|---|---|---|
| 10,202,259 B2* | 2/2019 | Scomparin | B61C 11/04 |
| 2005/0103576 A1* | 5/2005 | Engstrom | B66B 5/027 |
| | | | 187/307 |
| 2006/0170188 A1 | 8/2006 | Negre et al. | |
| 2014/0131140 A1* | 5/2014 | Verde | B66B 9/04 |
| | | | 187/250 |
| 2021/0300721 A1 | 9/2021 | Henneau et al. | |
| 2021/0316960 A1 | 10/2021 | Henneau | |
| 2022/0063959 A1* | 3/2022 | Nichols | B66B 9/04 |
| 2022/0162038 A1* | 5/2022 | Davidian | B66B 11/0423 |
| 2022/0185627 A1* | 6/2022 | Zhou | B66B 11/0226 |

FOREIGN PATENT DOCUMENTS

| | | | |
|---|---|---|---|
| FR | 2611684 A1 | | 9/1988 |
| KR | 20180073037 A | * | 2/2018 |
| KR | 20200002388 U | * | 10/2020 |
| WO | 2004/014715 A2 | | 2/2004 |
| WO | 2010/059139 A1 | | 5/2010 |
| WO | 2017/198725 A1 | | 11/2017 |
| WO | 2020/058349 A1 | | 3/2020 |
| WO | 2020/058352 A1 | | 3/2020 |
| WO | 2020/178832 A1 | | 9/2020 |

OTHER PUBLICATIONS

International Search Report and Written Opinion issued in International Application No. PCT/EP2021/081527, mailed on Feb. 23, 2022, 8 pages.

Extended European Search Report issued in European Application No. 20207456.3, mailed on Jun. 15, 2021, 7 pages.

* cited by examiner

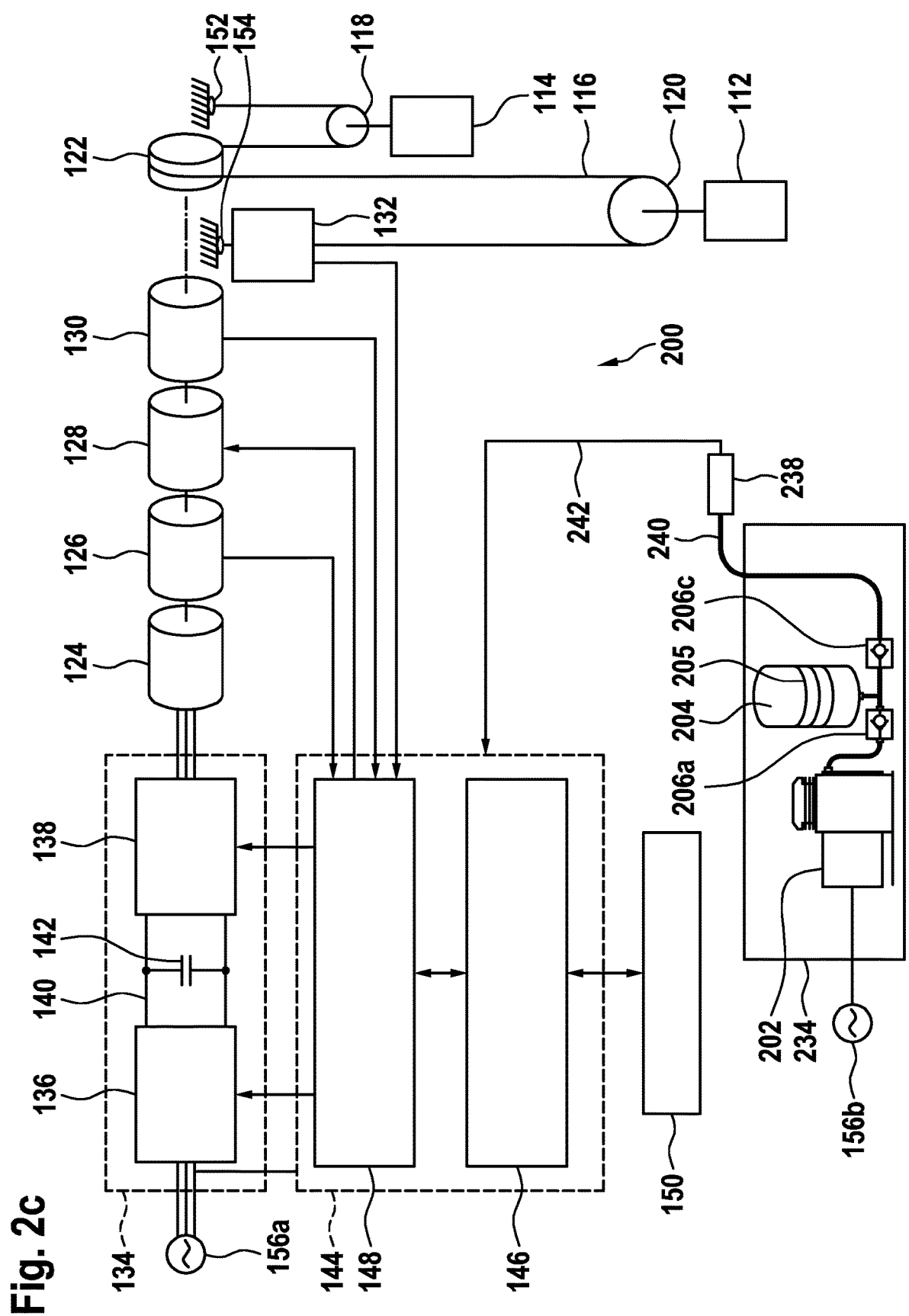

DURABLE PNEUMATIC ELEVATOR SYSTEM AND METHODS

CROSS-REFERENCE TO RELATED APPLICATIONS AND PRIORITY CLAIM

This non-provisional patent application is a 371 national stage of international application no. PCT/EP2021/081527, filed on Nov. 12, 2021, and titled "Durable Pneumatic Elevator System and Methods," and claims priority to European application no. 20207456.3, filed on Nov. 13, 2020, and titled "Durable Pneumatic Elevator System and Methods." The contents of both of these applications are incorporated herein by reference in the entirety.

TECHNICAL FIELD

The present disclosure relates to elevator technology.

In particular, the present disclosure relates to an elevator system using a novel powering scheme.

Further in particular, the present disclosure relates to an elevator system using a pressurised gas to power at least a part of the elevator system.

BACKGROUND

Elevator systems exist for more than 150 years now. An elevator is a vertical transport system that moves an elevator car between floors in a building or the like. Two main ways of driving an elevator system, i.e. the elevator car within the shaft, have been realised, the traction type elevator and the hydraulic type elevator.

Generally speaking, an elevator system comprises an elevator car and a counterweight, which are connected by a suspension medium. In a traction type elevator, the suspension medium runs through a sheave connected to an elevator drive that is adapted to move the traction medium and thereby raise or lower the elevator car and the counterweight. When the elevator car is raised, the counterweight is lowered at the same time, and vice versa. The counterweight is reducing a weight imbalance, thereby reducing the energy required to move the elevator car up and down in the elevator shaft. In a hydraulic elevator the elevator system employs either a hoist arrangement without a counterweight where a hydraulic cylinder attached to the car raises or lowers the car, or employs a counterweight connected to the car by the mean of a traction medium running around a pulley, which in turn is raised or lowered by a hydraulic cylinder. With this movement in connection to the hoist arrangement in the elevator shaft, the elevator cabin is raised or lowered.

Elevator systems, dependent on their size and dimensions and applications, may be considered power hungry appliances, utilising a significant amount of electrical energy in standby to ensure immediate availability when operation is demanded, and requiring even more electrical energy when in operation, i.e. when transporting passengers or goods up and down the elevator shaft.

In a typical elevator system, the energy demand of an elevator can be split in two components: the stand-by energy required to power the controller and components, which are active when the elevator is not travelling, and the energy required while travel, mainly to power the elevator drive which lifts the load. The energy standards such as the VDI 4707 refers to the energy specific demand to depict the energy required to lift a given weight, typically 1 kg over 1 meter. In absolute value, the power required to travel is much higher than the stand-by power. By the way of an example, 50 W represent the stand-by power of a residential elevator while the power required by the same elevator to travel would be in the range well above 1 kW, typically between 3 kW/h and 10 kW/h, exemplarily around 5 kW/h for a residential elevator with a speed of 1 m/s and a load of 630 Kg.

The energy consumption of an elevator installation is still a significant proportion of the total building electrical load. Estimates range from 5 to 15%, depending on the other services installed in the building. Residential and commercial elevator typically require a 3-phase electrical connection to bring enough power at the time the elevator is used. In a villa or in a multi-family home building, the elevator might be the only equipment requiring a 3-phase power network as most of regular home electrical equipment requires only 1-phase. Some home equipment such as a stove might also require a 3-phase but the cross section of the power network for a stove may be significantly smaller than the cross section of the power supply of the elevator. One particular aspect to consider is the peak of energy required when the elevator motor accelerates after the start: depending on the drive technology, the power peak when the elevators starts can be a factor of 2.5× of the nominal power. Moreover, elevators are mostly used during the peak periods during the day, where other energy consumers require energy as well. Considering all together, a common elevator may have a considerable impact on the dimensioning of the building power supply network.

Important to understand is the definition and sense of 'energy': Watt is a unit of power whereas kilowatt-hour (kWh) is a unit of energy. Typically, energy is measured in Watt per hour and represents the energy consumption of a device, in this context the energy consumption of an elevator. The consumption of an elevator can account for a significant proportion of energy consumption of a building. New technologies contribute to the reduction of the energy consumption of elevator: e.g., the stand-by energy may be reduced by the introduction of sleep mode of component such as the door mechanism, the controller or ACVF. Efficient gearless motors in combination with new traction media technologies such a belt technology helped to reduce the energy specific demand.

The dimensioning of the power network impacts the wiring layout and its installation in a building: because it is required to transport/supply more energy, a 3-phase cable has a bigger cross section than a 1-phase power feed. When considering all the components involved in the electrical power system in a building, such as circuit-breakers, terminal blocks, etc., it may be seen as much easier and convenient to install a cable with one phase than a multi-phase cable. A 1-phase power supply generally offers less available power than 3 phase systems. While it is possible to design an elevator to be powered by only one phase, this results in a considerable reduction of its performance in terms of nominal speed, acceleration and capacity.

For high-rise elevator, the power of an elevator can be well above 100 kW, and in such a scenario a 3-phase energy system is mandatory. However, it would still be beneficial to have a solution to reduce the current peak during the acceleration of the mass. Such reduction would allow to reduce the cross section of electric cabling, circuit-breakers and the electronic component involved in the speed regulation.

An important aspect to consider with elevators is the evacuation of stuck passengers. With the introduction of machine room less elevators with no access to the motor and brake, the evacuation usually relies on a pack of batteries to allow to move the car at slow speed in the most favourable direction (depending on car load) to the next floor. The battery usually allows only 1 evacuating of the maximum distance between two floors, typically 11 meters following the EN81 code. The dimensioning of the battery considers the power required to move the car but also of the essential components required to operate the elevator: the brake, car doors and the like. Since the elevator evacuates with a very low speed, compared to the normal travel speed, the power required for the brake and the door mechanisms represents an important energy demand during the evacuation. Additionally, the stand-by components required to power the elevator controller require energy as well. During power outages, the operation of an elevator is only possible with a second source of power, such as a generator that delivers energy to a building, in particular to an elevator.

WO 2010/059139 A1 describes an elevator design adapted to a reduced available power provides a reduction in travel speed in a situation where the elevator has to operate a cabin with an increased weight, close to a load limit. The power consumption, which increases due to the increase in load, is reduced by reducing the travel speed. While this reduces the power consumption, it also reduces travel comfort provided by the elevator system to the passengers.

WO 2017/198725 A1 describes system and methods for converting potential energy of a pressurised gas into mechanical work.

WO 2004/014715 A2 describes an urban or suburban transport vehicle which is motorised by means of compressed air motor alternators or motor compressors. Due to the independent movement however, it is necessary to provide the vehicle with a transportable gas tank, which is a significantly higher energy storage load than e.g. a fuel tank, thereby significantly reducing the range of travel.

WO 2020/058352 A1 and WO2020058349 A1 describe feeding the elevator controller from an intermediate electrical storage during stand-by situation. This intermediate storage stores energy when there is a reduced energy cost to reduce the cost of energy during standby. Energy for travel however is directly taken from the energy grid upon a travel demand.

EP 0 550 904 B1 describes an elevator comprising a vertical tube, a cabin for transporting passengers that is displaceably mounted in said tube and air suction means capable of causing a depression zone above the roof of said cabin for moving the cabin upwards by generating a vacuum above the cabin, while the cabin moves downwards by gravity.

WO 2020/178832 A1 describes a power drive for a conveyance using stored high pressure compressed air as a primary source, producing high pressure hydraulic fluid energy to move a servo-controlled hydraulic motor.

Thus, there may be a need for an elevator system with a reduced power consumption.

Further, there may be a need for an elevator system that allows to reducing or eliminating energy peaks when in operation, therefore allows the downsizing of the electrical energy supply.

Even further, there may be a need for an elevator system adapted to store energy, in particular in a safe and secure manner, to ensure immediate usability when requested by a user and/or allow evacuation of passengers during power outage.

Still further, there may be a need for an elevator system that uses mechanical energy derived from electrical energy, in particularly fed to the elevator system during a low-cost, zero cost or high energy supply/availability situation.

SUMMARY

At least one such need may be met by the subject-matter of the independent claims. Preferred embodiments are provided in the dependent claims and are explained in detail in the following description.

The present invention relates to a sustainable pneumatic elevator, comprising a pneumatic elevator drive employing pressurised gas to drive the elevator.

According to a first aspect of the present disclosure, there is provided an elevator system, comprising an elevator car and an elevator drive adapted to move the elevator car in an elevator shaft, wherein the elevator system further comprises a gas reservoir, wherein the gas reservoir is adapted for storing of a pressurized gas, and wherein the gas reservoir is connected to an element of the elevator system for powering at least a part of the elevator system.

According to a second aspect of the present disclosure, there is provided a method of operating an elevator system according to at least one of the preceding claims, the method comprising receiving an indication regarding a current energy availability and/or energy cost, and operating a compressor of the elevator system, in particular an electric motor of a compressor, for filling of the gas reservoir dependent on the received indication.

According to a third aspect of the present disclosure, there is provided a method of modernizing an elevator system, the method comprising installing a gas reservoir in the elevator system, wherein the gas reservoir is adapted for storing of a pressurized gas, and powering at least one element of the elevator system by gas stored in the gas reservoir, wherein the at least one element is at least one of a pneumatic elevator drive and a pneumatically operated generator. The installing may in particularly further comprise installing at least one of the pneumatic elevator drive and the pneumatically actuatable generator.

Current elevator systems are largely dependent on the supply of electrical energy. In current elevators, most if not all elements that are employed for driving the elevator, e.g. actuating an elevator car for the transport of passengers and goods as well as control elements controlling the operation of the elevator system are connected to a substantially continuous power feed, e.g. the power grid to which a building in elevator system is installed in is connected to.

An elevator connects to the electrical system of a building, which in turns connects to the power grid. The power grid consists of a network connecting power stations. The grid network is dimensioned to deliver the highest electrical power demand. The peak demand fluctuations may occur in daily, monthly, seasonal or yearly cycles. Elevators are mostly used during peak periods of a day, and of the grid network, and are less used when the grid network has a surplus of energy. One way to reduce the impact of the peak of elevator travelling demand, would be to reduce the elevator performance during peak periods, which however would considerably impact the user experience.

It is also required to have an explosion-proof design of elevator system. This is required for elevators installed in high-risk area such a refineries, chemical production plants and the like. Electrical elevators may not necessarily suit such requirements as some of its components may generate sparks. Making an electrical elevator explosion proof requires lot of design changes to isolate and encapsulate electrical components into explosion proof cabinets.

Another consideration when designing electrical elevators is that the drive system need to be over-dimensioned or need to be designed to deliver a higher-than-nominal power output power, in order to deliver high torque during extreme situations such as the release of the elevator car after a safety gear test with a fully loaded or overloaded elevator car. This is done during the first commissioning and during periodic safety tests. In such a test, a high force is needed to pull up the elevator car to release the actuated safety gear. Hi torque translates to high current in the motor causing overcurrent errors to be triggered for elevators that are dimensioned for the normal use of the elevator (nominal load travelling at nominal speed). Consequently, the electrical drive system, e.g. the ACVF, may have a special mode to allow a higher-than-nominal current during a short period of time to move the car upwards to release the safety gear. Such modes may also reduce the lifetime of the electrical components like power transistors, thyristors, IGBTs etc. during such a high current situation.

The brake system of an elevator, more precisely the actuators of an elevator brake are electromagnetic for low and mid-sized elevators (e.g. residential and commercial elevator systems). For high-rise elevators, the power required to actuate the brake pads may be higher, so it may be beneficial to use hydraulic actuators. Hydraulic brake actuators also allow a faster release of the brake, which may be important for the elevator performance. However, in a hydraulic brake, an electrical pump may be continuously activated during the period of elevator operation, causing consumption of energy power even when the elevator car is not travelling. Moreover, the use of oil may be considered to not be sustainable. Hydraulic brakes use brake fluid to transmit force when the brakes are applied. Since the brake fluid cannot be compressed, force is transmitted immediately and directly at each actuator when the valve is opened.

Another particularity of an elevator system is the variation of load during each travel. The power required to drive elevator drives varies with acceleration and direction of movement of an elevator car, as well as the load in the elevator car. For example, if an elevator car is being accelerated, or run upward, when the elevator car and its load have a combined weight greater than the weight of the counterweight, or is run downward, when the elevator car and its load have a weight that is less than the weight of the counterweight, energy is required to drive the elevator drive, the elevator drive, which in turn rotates the traction sheave. If the elevator car is levelling, or running at a fixed speed with a balanced load, a lesser amount of energy may be required by the elevator drive from the drive system. Even though elevators rarely travel with a fully loaded car, so that the nominal load is rarely reached, an elevator system is still designed to accelerate the car and (a maximum) load up to a nominal speed. A common elevator system is therefore over-dimensioned compared the average transported load. It would thus be beneficial to design a drive system for the average transported load and reduce the speed of the elevator for higher load. While this is feasible with an electrical drive system, it still leads to a deterioration of performance: an electrical elevator drive system is designed for optimal efficiency at nominal speed. Traveling longer distances at a slower speed may lead to the motor heating up, which also impacts the lift time of the power electronic used for the regulation.

Despite their obvious differences, hydraulic elevators and traction elevators have in common that they are both electrically powered. At a given moment in time, there is a direct translation of the consumed energy and the energy required for the motion, either by transforming at the time of use, electrical energy into oil pressure in the case of hydraulic elevator, or by translating the consumed energy into mechanical rotation of the traction sheave at the time of use. In the case of a hydraulic elevator, an electrical pump forces oil into a cylinder. In the case of traction elevator, the motor rotates a traction sheave, which in turn moves a traction medium which translates into a vertical movement of suspended loads: the car and the counterweight.

It thus may be beneficial to have an elevator with at least one of operating with 1-phase, or to reduce the size of a 3-phase network powering the elevator, to allow an elevator to operate longer that just a single evacuation during a power outage, to allow an elevator to draw power from the power grid when there is a surplus of energy and/or to stop drawing power from the grid when the grid demand has a peak, without impacting the elevator performance. Further, it may be beneficial to have at least one of an elevator which is explosion proof by design, thus without electrical component that may generate sparks, an elevator that has an elevator drive system that may handle speed adaptation of the elevator depending on the car load, without impact on its life time, any without heating up when travelling at a lower speed to accommodate higher load for which the drive system is designed for, an elevator having a drive system that is less sensible than an electrical drive system to release the safety gear when it is actuated with a fully or overloaded car, and/or have an elevator brake, which requires less electrical power to actuate the brake pads, or avoid hydraulic brakes.

In light of the aforementioned, the present disclosure proposes a solution that inter alia enables using a single phase power network for an elevator system while preserving its performance, operating an elevator during power outage, reduce the load on the grid during the usage of elevator during peak periods, reduce the peak of power during acceleration of an elevator and/or provide an explosion proof elevator.

One aspect of the present disclosure is the ability to differentiate the time at which the energy consumption is required and the time at which the energy is supplied. Indeed, today, substantially all elevators are fed from the power grid. The arrival of alternative sources of energy connected to the electrical grid makes the energy market very dynamic. Nowadays, it is common to trade the energy over energy markets. Digitalization technologies such as internet of things and cloud computing, make it easier to connect an equipment to the power grid when the energy is surplus and disconnect from the grid when the power network reaches a peak, be it in price and/or demand. As designed today, elevators cannot profit from a real-time capability to use energy when at lower cost, because the elevator transport capacity required by the elevator passengers, seen over time, need not coincide with the time at which the energy network has a surplus of energy. It is even the opposite: elevators are typically used during peak times, i.e. early morning, over lunch or in the evening, which are periods during which the energy costs are the highest.

Thus, the present disclosure relates to a new elevator motion technology, combined with a novel means of energy storage that allows the anytime use of the energy stored during time periods at which the grid has an excess of energy.

The present disclosure makes use of pneumatic technologies to power an elevator system by transforming electrical energy into mechanical energy in the form of compressed air. Storing compressed air is much easier and more economical than storing electrical energy in batteries. Storing energy in batteries is also not sustainable: depending of the battery technology, some batteries must be maintained, they have a limited life span and potentially their replacement is more costly than the gain from the energy storage over the battery life time. Storing compressed air is much simpler and less costly. One aspect of the present disclosure may be seen in that a pneumatic motor replaces or supplements the existing electrical motor of a traction elevator. The use of pneumatic technology allows to eliminate the drive unit, which regulates the speed of the electrical motor, in modern elevator systems typically an alternating current frequency converter (ACVF) or inverter. The speed and torque regulation of a pneumatic system may be easily implemented with a valve controlling the air flow to the motor.

Accordingly, the present disclosure provides an elevator system that comprises a gas reservoir for storing pressurised gas. The pressurised gas is subsequently fed to select and in particular suitable elements of the elevator system, in other words pneumatically operated elements. Those elements may either employ the pressurised gas directly for powering or actuating at least a part of the elevator system, e.g. may be a pneumatic motor directly driven by the pressurised gas. Additionally or alternatively, those elements may employ the pressurised gas to convert energy stored in the pressurised gas to yet another form of energy, e.g. electrical energy, to allow conventional powering, e.g. powering by electrical energy, for powering or actuating at least a part of the elevator system, e.g. by feeding the pressurised gas to a pneumatically operated generator which in turn generates electric energy. Thus, by providing an elevator system with a gas reservoir and a pneumatically operated generator, electric energy required for the operation of a common elevator system having an electrically powered elevator control as well as an electrically powered elevator drive may be provided via conversion from the energy stored in the gas reservoir, in particular in pressurised gas stored in the gas reservoir. The pressurised gas may be provided by using a compressor, which compresses the gas, e.g. air, and stores the compressed gas in the gas reservoir. The compressor in turn may be electrically powered.

A traction elevator with pneumatic technology as a drive system and the storage of compressed gas, e.g. air, may be seen as providing significant advantages compared to electrical traction elevators. The components required to regulate the motor speed may be simpler and less costly than an electrical regulation system (e.g. an ACVF). Its life time may also be much higher than an inverter whose life time is dependent of the number of the number of starts and stops of the elevator. Since air may be compressed during off-peak periods of the power grid, in particular when the elevator is not used, the power of the (electric) motor of the compressor to fill a gas reservoir may be lower than the power delivered by the pneumatic motor subsequently operating from or driven by the compressed gas stored in the gas reservoir. Potentially, a single phase connection to the power grid may be used instead of an expensive 3-phase connection. The energy may be stored over longer periods, e.g. when the energy of the grid is in surplus.

The gas reservoir may be a high pressure gas reservoir. E.g. the gas reservoir may have a storage pressure of up to 200 bar, in particular up to 250 bar, further in particular up to 300 bar or higher. Likewise, a further gas reservoir, e.g. arranged at the elevator car, may have a storage pressure of up to 200 bar, in particular to 250 bar, further in particular to 300 bar or higher.

The evacuation of trapped passengers is critical in elevator design. Typically, an electrical elevator system may make use of an emergency power supply or a bank of batteries to provide the energy to evacuate the passengers to the next floor. Such evacuation systems consist of extra components leading to higher system costs and extra used space. A pneumatic system may not require additional components because it is enough to keep a reserve of compressed air to allow evacuation or simply to continue the elevator operation, even in case of a full power outage.

Operating the elevator system may in particular be beneficial when considering a current energy availability or energy cost. The gas reservoir may be seen as a buffer or an energy storage means for storing energy that may subsequently be used for operating the elevator. Electric energy may be used for compressing gas to be stored in the gas reservoir thereby increasing the potential energy of gas stored in the gas reservoir. This potential energy may subsequently be used and converted to mechanical energy by the pneumatic motor. In other words, the energy stored in the compressed gas may be converted to energy employed for rotation of a traction sheave, which rotation may be used for operating the elevator system, i.e. for raising and lowering an elevator car to transport passengers and/or goods.

Energy available on the grid that is consumed normally has a cost associated to a unit of energy. At certain times, the current energy cost may be high, which may coincide with a high energy demand at this time, while at other times the cost associated to the energy may be lower, potentially even be zero or negative. In case of a negative energy cost, a consumer of energy would receive monetary compensation for consuming energy. E.g. in the context of the elevator system, in case the elevator is operated at a time where the energy cost is zero or negative, the owner of the elevator system substantially has no energy to pay or may even make money. It would thus be beneficial to be able to shift the consumption of energy to a time where there is a surplus of energy on the grid and thus the cost of energy is zero or negative, at least a time where the cost of energy is reduced versus a peak time, where the cost of energy is high.

In the context of this disclosure, the elevator system may thus be operated at a time where the cost of energy is low, zero or negative by operating the compressor by that energy to increase the energy stored in the gas reservoir. This stored energy may subsequently be employed for the operation of the elevator system regardless of a current energy cost. By using the gas reservoir as an energy storage means or a buffer, the elevator system may be operated while relying on such low cost energy. By this, the total cost of operation of an elevator system may be significantly reduced.

Information about a current energy availability and/or energy costs may be provided to the elevator system. Subsequently the elevator system, in particular the controller of the elevator system may determine that the price is right for filling the gas reservoir. The filling may likewise be dependent on a current level of energy stored in the gas reservoir. E.g., when the energy cost is at a first level, it may make economic sense to activate the filling of the gas reservoir from a low level to a high level, whereas in this scenario it would not make economic sense to fill the gas reservoir from a high level to an even higher level since this filling may consume more energy per stored energy unit than filling the gas reservoir from a low level to a high level. Even further, in case the energy cost is at a second level, in particular lower than the first level, it may make economic sense to fill the gas reservoir from such a high level to an even higher level or to completely full even though the filling may consume an increased amount of energy per stored energy unit.

The filling of the gas reservoir may thus be initiated by the elevator system itself when receiving indication about a current energy availability and/or energy cost, in particular when comparing said energy availability and/or energy cost with a predetermined threshold value. Additionally, or alternatively, the filling of the gas reservoir may be initiated by a remote unit communicatively connected to the elevator system. In this scenario, the elevator system may not need an indication regarding an energy availability and/or energy cost itself, since nearly the functionality of the filling of the gas reservoir is initiated.

Likewise, the elevator system and/or the remote unit may determine to initiate a filling of the gas reservoir irrespective of a current energy availability and/or energy cost, in particular when it is determined that the level of energy stored in the gas reservoir is below a certain threshold level. Said threshold level may be a pre-set minimum threshold level, set to allow the operation of the elevator system. E.g., when an expected demand of elevator operation is determined or calculated by the elevator system and/or the remote unit, that may not be fulfilled by a current energy level stored in the gas reservoir, a filling of the gas reservoir may be initiated by the elevator system and/or the remote unit regardless of the current energy availability and/or energy cost.

In particular the following may be provided by a pneumatic motor compared to an electrical motor.

Pneumatic motors may have much smaller installation dimensions than corresponding electric motors. Pneumatic motors may be loaded until they stall, without taking damage. They may withstand a substantially higher heat, vibration, and impact force. Pneumatic motors may be stopped and started continually without taking damage. The simple design principle of pneumatic motors makes them very easy to install and service and pneumatic motors are substantially lighter than comparable electric motors. Pneumatic motors may withstand harsh environments and the reliability of pneumatic motors is very high, resulting from the design and the low number of moving parts. Finally, the higher the power of an electrical motor is, the heavier it normally is due to the weight of its windings, typically coper and its magnetic materials.

In particular the following may be provided by a pneumatic motor compared to a hydraulic elevator. Pneumatic motors use gas which is easily compressible and provides good power density even at low pressures. The use of gas allows the implementation of a quicker reaction time. When you use area as a guess, the same is abundant and substantially free of any acquisition costs, there are no environmental concerns as well as a lower initial cost. Further, a pneumatic motor normally has a rather simplistic design and a low maintenance expenditure.

For any hydraulic elevator, the used fluids must be purchased, which pose a significant environmental threat when a leak occurs. The purchase of fluids results in a higher initial cost and hydraulic elevators are complex in design and have a very high maintenance expenditure.

However, a pneumatic system may be less efficient when compared to an electrical system. Potentially, an electric motor is 20% more efficient than a pneumatic motor. This however may be compensated by the operation to store compressed gas in a reservoir, i.e. filling the gas reservoir, at times where energy is in surplus, and thus has a reduced cost, even is free or the cost is negative. Such surplus energy otherwise gets lost as the grid always need energy consumers to consume a surplus in energy.

A pneumatic motor allows to adjust the torque output depending on a current demand. Contrary hereto, electric motors get their power from an alternating current (AC) or direct current (DC) power feed and while some electric motors feature multiple speed settings, the generated torque from the motor remains fixed.

A pneumatic motor provides precision speed control. The speed at which the motor may run is variable with a pneumatic motor. By increasing pressure of a gas fed to the motor, the speed and torque respond by increasing as well. Further, pneumatic motors provide reliable, repeatable results with every use that substantially remains for the complete lifecycle of the pneumatic motor. Contrary hereto, electric motors are not as reliable and will decrease in efficiency, over time. Specifically, a loss in performance may come rather the regulation units such an ACVF, DC converter and the like, which have a lot of electrical components with a lifetime shorter than the motor itself, e.g.: capacitors. Further, an electrical motor may break when e.g. there is a short circuit in its winding because of the heat destroying the isolation of the winding wires.

One of the biggest considerations in pneumatic motor vs electrical motor is the environmental impact and the application environment. Some environments are hazardous for electrical motors. Pneumatic motors are the first choice when working in an environment where corrosion could take place.

Electrical motors need to be specially designed and built to ensure that the units are explosion-proof. Such measures e.g. require the motor housing to be placed very tightly together, with little room between parts. The casings of such motors end up collecting moisture and corroding the moving parts of the electrical motor. Also, during operation, an electric motor hay heat up significantly, and may thus require substantial cooling, e.g. by using a fan, which in turn consumes energy, thereby increasing the total energy consumption of the electric motor system. Contrary hereto, a pneumatic motor may be considered as an at least partially self-cooling motor, due to the expansion of the compressed air within the motor housing during operation, which may well exceed the heat generated by moving parts of the pneumatic motor, e.g. due to friction.

Pneumatic motors are safe to use in wet environments. Electric motors need an environmentally controlled housing if they are to be used outdoors.

The size of a motor depends on the power requirement of a certain application. Considering a comparable application, pneumatic motors may be much lighter than electrical motors and may be easier to transport, since pneumatic motors connect to an external gas source. In comparison, electric motors include a power source, e.g. the windings and other elements required for the operation, i.e. rotation, of the motor and a motor housing all in one unit. Further, for comparable motors, e.g. regarding the total weight, a pneumatic motor has a higher power output than that of its electric counterpart.

In applications where torque and power requirements are variable, a pneumatic motor is beneficial. In comparison, electric motors are more energy efficient, but at a loss of versatility.

Further, pneumatic motors provide safety benefits. Pneumatic motors regularly do not overheat or generate sparks, so there is a reduced risk of fire or explosion in sensitive areas, which is why pneumatic motors are preferred for applications in ATEX environments. Pneumatic motors do not emit electromagnetic radiation during operation that could cause any adverse effects, and there is no risk of an "air-hammer" effect in case of jamming. Also, a pneumatic motor does not generate any electromagnetic radiation during operation as opposed to an electric motor.

Pneumatic motors provide benefits when an application requires flexibility. The power-to-weight ratio of a pneumatic motor is 5 to 6 times higher than that of a comparable electric motor. In consequence, pneumatic motors provide a benefit for applications where there are space limitations. A pneumatic motor may operate in any position or orientation. Normally, a pneumatic motor does not require a sophisticated control system. Rather, the torque and/or rotation speed can be varied by the gas supply flow or gas pressure.

Pneumatic motors regularly may be used in the both rotation directions (clockwise and counter-clockwise) and even may be reversible (providing rotation in both directions). Pneumatic motors regularly don't get damaged in case of rapid reversals, which may be a problem for and damage an electric motor. Pneumatic motors may operate in extreme temperature conditions, e.g. operate reliably from −30° C. to +150° C. "Stop & go" cycles are not critical for pneumatic motors as there is a very low risk of damage by overloading or continuous stalling, which adds to their reliability. When stalled, a pneumatic motor may not significantly heat up or deteriorate, even at elevated cycles.

Pneumatic motors do not generate any current peaks upon starting and are continuously cooled by the gas expansion of the supplied compressed gas, preventing it from overheating, even at very high speeds.

Finally, pneumatic motors provide an increase in productivity. Installation costs are reduced, they do not require a sophisticated control and protection system like circuit breakers, contactors, variable speed drives, etc., a simple airflow output/pressure regulator is sufficient. Maintenance costs are reduced. The design is proven and reliable, mechanical parts are available, and there are no particular skills and/or specific authorizations required. Finally, motor recycling is easy, due to the materials used in its manufacture.

The technical concept of the present disclosure may in particular be beneficial to allow a delayed charging (i.e. a charging over time) of the elevator system by storing compressed gas at least in the first gas reservoir over an extended period of time. In other words, as long as the charging over time, i.e. the filling of the gas reservoir, is performed with a (slightly) higher rate than the removal of compressed gas from at least the first gas reservoir due to the operation of the elevator system (i.e. total removal over time), the elevator system may remain operational substantially indefinite. Such an application scenario may allow the operation of the elevator system in a scenario where only a low amount of continuous energy is available. E.g. with a single phase electrical connection, the total amount of energy provided to the elevator system at a given time may be less than what is required for the actual operation of the elevator system, but sufficient to provide more energy over time than is used by the elevator system over time. Here, the gas reservoir may act as a buffer to store energy over any extended period of time while providing sufficient (mechanical) energy for the actual operation of the elevator system.

In addition or alternatively to a low power energy connection, e.g. to a public energy grid, the application of further energy sources may be conceivable as well. E.g., in case the electrical energy is provided by solar cells, the energy generated by these may also only provide for a delayed charging of the elevator system, i.e. a delayed filling of the gas reservoir. Further, the gas reservoir may act as a buffer for that time of the day, namely night, where substantially no energy can be generated by solar cells.

Still further, it may be conceivable that the electrical connection from the electrical grid to the elevator system is dimensioned such that only a low amount of instantaneous current and thus electrical power can be provided to the elevator system without damaging the electrical connection to the elevator system, e.g. by overload of electrical conductors. This instantaneous electrical power may again be insufficient to operate the elevator system. However, the electrical conductors may be sufficiently dimensions to allow the delayed charging of the elevator system by providing a continuous electrical energy to the compressor, in particular the electric motor of the compressor, for filling of the gas reservoir. In other words, the energy required to operate the elevator system is stored in a delayed manner over an extended period of time, stored in the first gas reservoir, from which an instantaneous energy demand may be served.

In this context, it may be conceivable to have a hybrid solution where the drive of the elevator is a combination of an electrical drive and a pneumatic drive, or a combination of two drives come, one being electrical and one being pneumatic. The electrical drive may be adapted to, in particular be dimensioned to, operate the elevator system during a normal travel phase. The pneumatic drive may be adapted to provide additional (mechanical) power to drive the elevator system, the elevator car, during acceleration and/or deceleration of the elevator car, thus at the beginning and the end of an elevator trip. Still alternatively, it may be the pneumatic drive adapted for providing power for the normal travel phase while the electrical drive may be adapted to provide additional power to drive the elevator system, the elevator car, during acceleration and/or deceleration. This may allow the application of an elevator system according to the present disclosure in a situation where the electrical system of the elevator system is arranged and/or dimensioned only to the extent to provide normal operation during a normal travel phase. E.g., electrical conductors could be dimensioned such that a suitable current can be conducted during the normal travel phase, but not the current that would be required during at least an acceleration phase, e.g. because the conductors are dimensioned so that the actual current required during at least the acceleration phase would overload and potentially damage the contactors. The implementation of a pneumatic drive and/or a hybrid arrangement, e.g. during a maintenance or overhaul of the elevator system, may thus allow the use of an e.g. older, potentially under-dimensioned electrical system, while allowing to increase the elevator performance when installing new components. E.g., the retrofit of an old drive system with a new drive system would result in an increased power demand, which potentially an old electrical system could not cope with any more, at least not without taking damage or lacking appropriate certification. Here, a second drive system, a pneumatic drive system, could be provided where the pneumatic drive system covers the phases of high power demand like acceleration and deceleration, while the electrical system covers the normal travel phase. Likewise, alternatively to adding a second drive system and maintaining or replacing the first drive system, an electrical drive system, a new drive system embodied as a hybrid system may be installed.

One application scenario may be seen in combining a common (electric) elevator drive with a pneumatically operated or actuated generator, which generates the electric energy required for the operation of the elevator system, specifically the control aspects of the elevator system. Here, the electric energy may come exclusively from the pneumatically actuated generator, driven by the pressurized gas stored in a gas reservoir of the elevator system. In other words, some or all of the elevator control components may be exclusively connected to the electric feed of the generator, and not to the power grid or a power feed of the building the elevator is installed in. Alternatively, the some or all elevator control components may be connected in parallel to the electric feed of the generator and the power grid. Here, it is conceivable to power the elevator control components from the power fed from the power grid, and in select situations, alternatively or additionally, from the electric feed of the generator. Such select situations may occur in case e.g. the power grid is at or near capacity or overloaded, may be dependent on a current energy availability or cost.

Further advantages of an pneumatic generator generating electric energy and being powered by pressurized gas, e.g. air, in combination with an existing electrical drive may be seen as the following: Such an elevator system may contribute to grid balancing with alone or with further existing elevator systems, e.g. of the same building. A simplified modernization of an existing elevator is conceivable with a modernizing kit (e.g. consisting of only a compressor, a gas reservoir and generator, potentially with associated control electronics adapted to connect to the existing elevator control) allows any of the existing elevators or elevator systems to contribute to energy balancing of the grid by activating the compressor during energy surplus of the grid and making use of the compressed gas during periods of high energy demand from the grid, e.g. during the day, to power the stand-by of the elevator controller. Likewise, when the grid needs energy consumers, it in particular my need energy consumers with a high demand, such as a single phase or three-phase electrical motor of the compressor. Regularly, residential elevators may not make many trips, typically less than 50 trips per day. For such elevators, the energy required to keep the system (e.g. its elevator controller) alive (seen over time typically over 1 day or 1 year) may represent a considerable amount of energy compared to the energy required by those few trips a day themselves, especially if an elevator is equipped with an energy efficient electrical drive. Such a modernization kit may allow, without the modernization of the whole elevator, to profit from the grid balancing functionality: to load (i.e. to consume power from the grid) the grid when needed and to unload it (i.e. reduce the consumed power) during peak periods. Such modernized elevators may make a significance difference when providing their balancing functionality. E.g. 75 W/h stand-by power for one elevator, seen for a country with 100'000 elevators, can shift 7.5 Mw/h in time by charging the gas reservoir during night and using the stored energy during day. Such also allows for a step-by step modernization: a customer may profit from the described pneumatic technology with an existing elevator (drive) as it is, or with a new controller. At a later point, the electrical drive may be replaced by a pneumatically operated elevator drive then connected to the gas reservoir already in place from the 1st modernization phase.

The present disclosure has mainly been described in the context of a traction elevator. In a traction elevator, it is conceivable that the elevator drive may be embodied as (or, in the context of a modernization, may be substituted with) a pneumatic elevator drive or pneumatic motor while, alternatively or additionally, the elevator control and/or other elements requiring electric energy may be run by electric energy generated by a pneumatic generator a described. Likewise in the context of a modernization, the elevator system may be provided with such a pneumatic generator, thereby allowing to permanently or at least intermittently to disconnect or at least not rely on electric energy fed from the energy grid.

The present disclosure may however also be implemented in a hydraulic elevator. Here, the most likely scenario is the implementation of a pneumatic generator as described above, for the power grid independent generation of electric energy for the elevator control and/or other elements requiring electric energy of the elevator system.

In the following, terms used in the context of this disclosure are explained further.

A traction medium regularly is one or a plurality of traction steel cables in particular connecting the elevator car and the counterweight. Alternatively, a traction medium may be one or a plurality of traction belts, which are steel ropes embedded in a stabilising material, for example polyurethane.

An elevator drive may be a geared or gearless elevator drive. In geared elevators, a gearbox may be attached to the elevator drive between the shaft of the elevator drive and that traction sheave. Alternatively, in geared less elevators, the traction sheave is attached directly to the shaft of the elevator drive or motor.

Driving the elevator system, in particular the elevator car, in particular means a raising and/or lowering of the elevator car in the elevator shaft. In this context, a raising of the elevator car normally results in a lowering of the counterweight and vice versa. It is further to be understood that elevator shaft in the context of this disclosure shall not be understood as being limited to a construction where an elevator car may substantially only move vertically, i.e., up and down. Rather, in particular where there is a car mounted elevator drive, e.g., a pneumatic elevator drive, such allows a substantial free movement of the elevator car within the elevator shaft in any direction, as long as the construction of the elevator shaft allows it. E.g., the elevator car can move diagonally or horizontally, driven by the car mounted elevator drive. Such may be realized with suitable arrangements in the elevator shaft, like guide rails or the like, to which the elevator car is connected, so as to hold the elevator in the elevator shaft. Alternatively, the elevator car may connect directly to the shaft walls, e.g. by wheels arranged at the outside of the car, so to clamp or hold the car in the interior of the shaft at a defined position, while allowing movement within the shaft by the wheels. A combination of both is conceivable. Likewise, the elevator car may comprise arrangements, e.g., a suitable actuated wheel structure or the like, to substantially move within the elevator shaft, e.g., by contact with at least one of the guide rails, or at least one of the elevator walls, without external support structures. In both examples the elevator drive may provide the actuation of the elevator car in accordance with the movement capabilities or freedom within the elevator shaft. E.g., the elevator drive may turn wheels to drive the elevator car along the guide rails or the shaft walls. Pressurised gas may in particular be pressurised air, which is regularly ambient air taken from the vicinity of the elevator system. The pressurised gas may be the only energy source directly connected to the drive system of the elevator system. In other words, there may only be an electrical connection to a compressor, or rather the electric motor for actuating the compressor; and the electric energy fed to the compressor/its electric motor may exclusively be used for compressing air for storage in the gas reservoir. Any subsequent energy feed to the elevator system for operating the elevator system may be exclusively from the energy stored in the pressurised gas. At least it may not be an electric energy source connected from the power grid, potentially it may be electric energy produced by a generator operated by the compressed gas stored in a gas reservoir. This is allows the implementation of an non-electric elevator system where the primary elevator functions, the driving of the elevator cabin, as well as the secondary elevator functions, control of the elevator system, the opening and closing of elevator doors and the like is actuated from energy provided by the pressurised gas stored in the gas reservoir. This may include a complete non-electrical operation of the elevator system and alternatively or additionally powering select elements of the elevator system electrically by electric energy generated from the pressurised gas stored in the gas reservoir. In this case, there may be no direct connection between an elevator system external power source like the power grid or e.g. a renewable energy source like solar cells and the elevator system, used for operating the elevator system. In other words, the elevator system may be galvanically isolated from an external power source as the only transmission of energy is by the pressurised gas. Outside energy is employed to compress gas for storage in the gas reservoir, which in turn is employed to power the elevator system. Again using a different language, an external energy feed is exclusively connected to the at least one electric motor of the compressor.

A pneumatic elevator drive or a pneumatic motor is a drive/motor that is actuated by the energy stored in a pressurised gas, e.g. air. Such a pneumatic motor, air motor or compressed air engine is a type of motor that does mechanical work by expanding a compressed gas. Pneumatic motors generally convert the compressed air energy, i.e. the potential energy stored in the compression of the gas, to mechanical work through either linear or rotary motion. Linear motion can come from either a diaphragm or piston actuator, while rotary motion is supplied by either a vane type air motor, piston air motor, air turbine or gear type motor. A pneumatic motor in the contact of this disclosure in particularly is not a combustion motor, combusting or burning a fuel gas.

A pneumatic generator in the context of this disclosure is a device that converts motive power (mechanical energy) into electrical power. Specifically, such a pneumatic generator converts the mechanical energy stored in a pressurized gas to electric energy. In other words, the pneumatic generator converts the potential energy of the pressurized gas into electrical energy. A part of the pneumatic generator may be a pneumatic motor similarly to the pneumatic motor as described above. A further element or device connected to the pneumatic motor may convert the rotation of the pneumatic motor into electrical energy.

In a particular embodiment, the pneumatic motor and the pneumatic generator may be combined in that pressurized gas is fed to the pneumatic motor or the pneumatic elevator drive for raising and lowering the elevator car, while the pneumatic motor further generates electric energy. This further conversion may be performed by an element converting the rotation of the pneumatic motor into electric energy. This energy may be stored in a suitable electrical energy storage element, e.g. a battery or a capacitor, and may be provided to electric elements of the elevator system, e.g. a controller, from the energy storage element over time, and in particular detached from a current operation of the pneumatic drive.

The pressurised gas may be non-combustible, non-burnable or non-flammable. The pressurised gas may in particular not be a gas commonly used as a fuel. The pressurised gas, when used, may in particularly be not burned or oxidized for the generation of mechanical energy in the pneumatic elevator drive and electric energy in the pneumatic generator.

According to an embodiment of the present disclosure, the element may be at least the elevator drive, wherein the elevator drive may be a pneumatic elevator drive, wherein the gas reservoir may be connected to the elevator drive, and wherein the gas stored in the gas reservoir may be feedable to the elevator drive for actuation of the elevator drive, for moving the elevator car in an elevator shaft.

The elevator car may thus be moved by the energy stored in the pressurized gas. The pneumatic motor may be propelled by the pressurized gas, and thus be put into motion or rotation, e.g., so to run the traction sheave of the elevator system for raising and lowering the elevator car. Likewise, when the elevator car is a self-supporting elevator car, supported in the elevator shaft by suitable shaft support arrangements, so to be held in the shaft and be able to move within the shaft, either vertically and/or horizontally, the rotation of the pneumatic motor may be used to drive the elevator car. E.g., by providing the rotation to a suitable wheel arrangement, either part of or separate from the shaft support arrangement, the elevator car may move within the elevator shaft by suitable friction movement of the wheel arrangement on the elevator shaft walls. The pneumatic motor may subsequently comprise a gearbox for changing the rate of rotation of the pneumatic motor to a rate of rotation required by the wheel arrangement.

According to an embodiment of the present disclosure, the elevator drive may be arranged at the elevator car, further in particular the gas reservoir may be arranged at the elevator car.

In other words, the elevator system comprises a gas reservoir arranged at the elevator car, wherein the gas reservoir is arranged to provide pressurized gas to the elevator drive for actuating the elevator drive, for moving the elevator car in an elevator shaft.

With a gas reservoir at the elevator car, the elevator car provides and supports its own power source in the form of a pressurized gas to allow independent and free movement within the elevator shaft. With an elevator drive and further in particular a gas reservoir arranged at the car, the elevator car may substantially freely more within the elevator shaft without the limitations imposed by e.g., a traction medium. The elevator car may thus not only move in the vertical direction, but also in a horizontal direction, in as far as the elevator shaft system allows it. For example, the elevator shaft may have a vertical shaft section for moving between floors but may also comprise horizontal a shaft section for moving to various landing on the same floor. E.g., in case of a large building, the elevator car may move to a certain floor, and further move on that floor to a elevator landing in a different section of the building. It may also be conceivable to have an elevator shaft alternative to or in addition to a regular hallway, so that the elevator car can service each apartment on a certain floor individually. Such a substantial free horizontal and vertical movement required a certain accommodation of the elevator car within the elevator shaft, like guide rails to which the elevator car, in particular releasably, attaches, or a dedicated arrangement to accommodate the elevator car directly in the shaft, e.g., by supporting the elevator car against the wall by suitable wheel structures, that allow sufficient pressure to be exhibited on the elevator shaft walls, so to hold the car in place while it is not moving, and allow a substantially free movement along the freedoms of movement within a particular shaft by actuating the wheels.

According to a further embodiment of the present disclosure, the elevator car may be a self-supporting elevator car.

Self-supporting in the context of this application means that the elevator car is able to operate, i.e., move within the elevator shaft, potentially substantially without a dedicated suspension medium. The elevator car may use guide rails or the like for guiding and holding in place while a car mounted elevator drive is used to actuate the car within the shaft. E.g., the elevator drive may actuate wheels or gear wheels that operates together with the wall of the elevator shaft or the guide rails element for moving the elevator car within the elevator shaft. Wheels, e.g. rubberized wheels, they move along the walls of the elevator shaft propelling the elevator car while gear wheels may act together with toothed guide rails the elevator car within the elevator shaft. Such a self-supporting elevator car may allow to move vertically but also horizontally. In case of a vertical movement, the wheels may act on the vertical shaft walls or on a vertical guide rail while in case of a horizontal movement, the wheels may act on the horizontal shaft walls, in particular the bottom or on horizontal guide rails, in particular the horizontal guide rail or a plurality of horizontal guide rail arranged at the same side of the elevator car, e.g. arranged adjacent to the bottom side of the elevator car or arranged adjacent to the top side of the elevator car. In such a case, the elevator car may substantially sit on the (same-side) guide rail(s) or be suspended from the (same-side) guide rail(s).

According to a further embodiment of the present disclosure, the elevator system may comprise a plurality of self-supporting elevator cars adapted to be operable in parallel in the same elevator shaft.

Since a self-supporting elevator car does not require any external suspension medium and may substantially move freely within the elevator shaft by wheels or gear wheels, acting on the elevator walls and/or guide rails, a plurality of self-supporting elevator cars may operate substantially concurrently within the same elevator shaft. In such a scenario, the maximum operational distance is determined by the current or future position/operation of other elevator cars within the same shaft.

According to an embodiment of the present disclosure, the gas reservoir may be arranged to be fillable when the elevator car is at a floor landing and/or a dedicated filling position within the elevator shaft.

In other words, an external gas feed may be used to fill the gas reservoir while the elevator stops at a floor landing, in particular a dedicated floor landing, and/or alternatively at a dedicated filling position in the elevator shaft. E.g., the elevator car may be arranged in the elevator pit, e.g., supported with a dedicated support structure, so to be able to remain there without the need of an energy source of energy feed, and to provide a defined and repeatable position. An external gas feed may then provide pressurized gas to the gas reservoir for filling the gas reservoir at at least one of these dedicated positions.

According to an embodiment of the present disclosure, the elevator system may be arranged at an operation location, wherein the operation location comprises a multipurpose source of compressed air, and wherein the multipurpose source of compressed air is adapted to provide pressurized gas to the elevator drive for actuating the elevator drive and/or for to provide pressurized gas to the elevator system for filling a gas reservoir of the elevator system.

Certain buildings and especially on ships, there may be a source of compressed gas readily available. E.g., it is common on ships to have groups of air compressors used as auxiliary machinery. The compressed air may thus be directly delivered to the elevator system, in particular the gas reservoir, for filling the gas reservoir and/or for actuating the elevator drive. The multi-purpose source of compressed air may thus be connectable and/or disconnectable to the gas reservoir, in order to fill the gas reservoir at filling position/floor landing for the next x numbers of subsequent trips, e.g., the next trip, the next two trips or the next three trips, generally a certain defined number of trips. In this case, the gas reservoir may be provided with a reduced size and this weight.

According to a further embodiment of the present disclosure, the elevator system may further comprise a compressor for filling the gas reservoir with gas and an electric motor for actuating the compressor. The elevator system may comprise in particular at least two electric motors, wherein the first electric motor may be a single phase and/or low-power motor and wherein the second motor may be a multiphase and/or high-power motor. Still further, each electric motor may be connected to a compressor and be independent from the other motors/compressors.

By using the electric motor, gas, e.g. air, may be compressed and provided to the gas reservoir or for storing. The gas may be taken from a dedicated source or from the surroundings and fed to the gas reservoir, e.g. one or more gas tanks. When using at least two electric motors, one motor may be a motor requiring (significantly) less energy than the other motor. The motors may be connected to the compressor substantially simultaneously but may in particular comprise a freewheeling mode so that if one electric motor is operating, the second motor is freewheeling, i.e. not acting as an energy consuming element or brake. The at least two motors may be arranged in series or in parallel. It is also conceivable that both motors may be actuated at the same time, thereby further increasing mechanical energy provided to the compressor.

One motor may be a single phase motor while another motor may be a multiphase motor. However, even in the scenario of one motor, said motor may be a single phase motor or a multiphase motor. A single phase motor may require less energy than a multiphase motor and may in turn provide less mechanical energy to the compressor than a multiphase motor. Accordingly, when using a single phase motor, the energy requirements of the elevator system is reduced compared to a situation where a multiphase motor is used or activated. Consequently, the use of a single phase motor may increase the time required to fill the gas reservoir by the compressor, while a multiphase motor may reduce the time required for filling of the gas reservoir.

Dependent on a current energy cost and/or energy availability, the single phase motor or the multiphase motor may be selected. E.g., during the day, when an increased demand of the elevator system is expected, the multiphase motor may be used to quickly replenish the amounts of pressurised gas stored in the gas reservoir to ensure a substantially continuous usability of the elevator system. Alternatively, e.g. during the night, when energy prices are low and no or low demand of the elevator system is expected, the single phase motor may be used for any extended period of time to fill the gas reservoir more slowly. Also, filling the gas reservoir with a single phase motor and thus more slowly than with a multiphase motor may result in lower noise emissions occurring due to a lower fill rate provided by the single phase motor.

An electric motor for actuating the compressor may have a smaller, in particular substantially smaller, power rating then the pneumatic motor driving the elevator system. Such an embodiment is enabled by a long-term or continuous feed of electrical energy, in particular low power electrical energy, to the electric motor which thereby uses the provided electrical energy long-term or continuously to compress gas for filling the gas reservoir. The energy stored in the gas reservoir in turn is employed for driving the elevator system. Energy retrieval from the compressed gas may allow the retrieval of more energy in a defined (short-term) period of time than would be obtainable from the electric feed from an external energy source like the power grid or from the electric motor itself.

According to a further embodiment of the present disclosure, the elevator drive may comprise a gas inlet for receiving pressurised gas and may further comprise switching means adapted to switch the direction of movement of the elevator car actuated by the gas received.

By using switching means integrated in or arranged near the elevator drive, substantially only a single pressure feed from the gas reservoir to the elevator drive is required to actuate the elevator drive in two opposite directions for raising and lowering the elevator car in the elevator shaft. This reduces installation time and cost and also reduces space required for providing the feed.

According to a further embodiment of the present disclosure, the elevator drive may comprise at least two gas inlets for receiving pressurised gas, wherein the elevator drive may be adapted to receive gas via one of the at least two inlets for moving the elevator car in a first direction and may be adapted to receive gas via the other one of the at least two inlets for moving the elevator car in a second direction opposite the first direction.

In other words, receiving gas through one of the two inlets actuates the elevator drive to turn the drive in the first direction, while receiving gas through the other one of the two inlets actuates the elevator drive to turn the drive in the second direction opposite the first direction. Switching means may be arranged outside of the elevator drive for directing arriving gas into a specific inlet of the at least two gas inlets, thereby determining the direction of rotation of the elevator drive, which in turn translates into a raising or lowering of the elevator car. Alternatively, at least one gas feed coming from the gas reservoir is connected to each gas inlet, so that a direction of actuation may be set by activating or deactivating a gas feed. This also may provide a failsafe mechanism, where when both feeds are open and thus substantially the same pressure is applied to both inlets. In consequence, the elevator drive is not moving/rotating. Alternatively or additionally, no applied pressure to both feeds of the pneumatic motor may also result in a brake element in the pneumatic motor to be activated as a further failsafe mechanism to avoid the turning of the elevator drive with no applied pressure, e.g. in case of a malfunction of the compressor, an empty gas reservoir or a rupture in a gas feed. This ensures that an elevator car that is potentially unbalanced does not start to move unintentionally. This operating principle applying two inlets may obviously be applied to further motors or drive systems as well, e.g. for door mechanisms for opening and closing an elevator car door and/or a landing floor door.

According to a further embodiment of the present disclosure, when the elevator car may be moved in a first direction gas may be removed from the gas reservoir for actuating the elevator drive and/or when the elevator car may be moved in a second direction, gas may be added to the gas reservoir by the elevator drive, depending on the car load.

In other words, the elevator drive may be employed for supplying gas to the gas reservoir, thereby increasing the pressure. E.g., in a situation where energy is gained by moving the elevator car in a certain direction, no external, in particular mechanical energy is actually needed to move the elevator car. E.g., in case the elevator car is heavier than the counterweight, the elevator car has a natural tendency to a downwards motion. That downwards motion in the direction of the higher weight does not require energy but in turn provides a source of energy. In consequence, instead of a source of energy, a brake force is required to control the movement of the elevator car. Such a brake force may be provided by arranging the elevator drive to feed gas towards the gas reservoir. In this scenario, the elevator drive acts as a compressor, feeding compressed gas towards the gas reservoir. With this, the energy consumption of the elevator system may be reduced further by recuperation of energy stored in the elevator system, which is used for filling the gas reservoir.

According to a further embodiment of the present disclosure the elevator system may further comprise a processing element for operating the filling of the gas reservoir, in particular for operating the at least one electric motor of the compressor.

The processing element may be adapted to operate the at least one electric motor in a way that switches on and off the electric motor for filling the gas reservoir. Additionally, or alternatively, the processing element may be adapted to determine a current pressure and/or a target pressure of the gas reservoir and operate the electric motor appropriately for filling the gas reservoir and/or maintaining defined gas level or threshold pressure. Here, a pressure sensor may be arranged at the gas reservoir to determine a current gas pressure in the gas reservoir.

Additionally or alternatively, the processing element may comprise or may be connected to an element to activate the filling of the gas reservoir, in particular activate operation of the electric motor(s) of the compressor for filling the gas reservoir. The element may be a simple time element, like a timer or a clock. The element may thus operate the filling of the gas reservoir dependence on, e.g. a timespan passed since the last filling, a defined time of the day, a current pressure of the gas reservoir or an arbitrary combination of the aforementioned. E.g., during the night between 1 o'clock and 4 o'clock, when it may be assumed that the cost of energy is commonly low or negative, the element and/or the processing element may activate the filling of the gas reservoir. Likewise, the filling of the gas reservoir may be initiated during a time where there is only a reduced energy demand on the energy grid and/or within the building where the elevator system is installed, and thus a total energy consumption may be balanced. In particular when considering the building where the elevator system is installed, it may be beneficial to balance the total energy requirements of the building by distributing the available energy across all consumers. In case further elements in a building have a higher current energy demand, the elevator system may in turn reduce its energy demand by not refilling the gas reservoir. Likewise at times where there is a low or otherwise energy demand in a building, the elevator system may be refilled, again balancing the total energy demand of the building.

The processing element may also be a general control element controlling in addition to the operation of filling the gas reservoir at least part overall of the elevator functionality like driving the elevator car, ride scheduling operation of open and closing of doors et cetera.

According to a further embodiment of the present disclosure, the elevator system may further comprise a communication element adapted to receive instructions for operating the elevator system, in particular operating the filling of the gas reservoir, and/or adapted to transmit operation data of the elevator system to a recipient device.

According to a further embodiment of the present disclosure, the elevator system is adapted to receive operating instructions for activating the filling of the gas reservoir, in particular via the communication element, further in particular wherein the instructions are indicative of or dependent on a current energy cost and/or current energy availability.

The instructions received for operating the elevator system may comprise operating the elevator per se, e.g. operating the raising or lowering of the elevator car, opening and/or closing elevator or landing floor doors, and the like. Additionally or alternatively, the instructions may operate the filling of the gas reservoir e.g. by instructing the processing element to operate the electric motor of the compressor.

The communication element may be connected to a network system, e.g. a closed network system or an open network system like e.g. the Internet. The communication element may be a wireless or wired communication element like a local area network element, a Wi-Fi element or a mobile communication element. The communication element may alternatively or additionally be adapted for receiving wireless near field communication like Bluetooth.

The recipient device may be any recipient where a data originating from the elevator system may be addressed to. For example, the recipient device may be a server system controlling the operation of the elevator system or of a plurality of elevator systems. The service system may e.g. be a cloud-based server system that is self is connected to the Internet or a further communication network. The server system may receive or contain information regarding a current or future energy cost and/or a current energy availability. In other words, the services they may have information for determining a preferred operation of the compressor, in particular the electric motor of the compressor, in particular regarding the time for filling the gas reservoir by activating the electric motor of the compressor. E.g., in a situation where there is an energy surplus, energy costs may be reduced and may even be negative. Accordingly, the future operation of the elevator system may be assured by filling the gas reservoir at a time of a reduced cost or even at a time where the operator of the elevator system is receiving a compensation, e.g. a monetary compensation for using energy. E.g. during the night where a reduced overall energy demand may result in reduced or negative energy prices, the motor of the compressor may be activated for filling the gas reservoir. Likewise, at a time where renewable energy, like wind energy or solar energy is generating more energy than is currently in demand, the energy costs could be low or even negative. The server system may be connected to or be part of an energy market, like the EEX (European Energy Exchange) in Leipzig. This server system or recipient device may in turn be also adapted for providing operating instructions to the elevator system, e.g. for activating the filling of the gas reservoir.

According to a further embodiment of the present disclosure, the elevator system may further comprise at least one elevator car door and/or at least one floor landing door, wherein the at least one elevator door and/or the at least one floor landing door may be pneumatically operable.

In other words, the respective door may be opened, closed, kept closed, kept opened or locked in a certain position by providing a pressurised gas to their respective door. The respective door may comprise pressure operated elements to provide the aforementioned functionality. In particular, the respective door may remain closed, in particular locked, without application of the pressurised gas. Such again provides a failsafe operation. In particular the respective door and/or the pressure operated element allows the opening of a door or opens the door or actuates a door mechanism when pressurised gas is applied/provided. In particular the gas feed to the at least one floor landing door may be a gas feed installed in the elevator shaft and connected to the first gas reservoir. Pneumatically and/or electrically operated valves may be employed for providing pressurised gas from the gas feed to a suitable door mechanism in particular controlled by a processing element, which processing element may be separate or identical to the processing element for operating the filling of the gas reservoir and/or for operating the electric motor of the compressor. The gas feed may be a suitable tubing arrangement of suitable pressure hoses or metallic pipes or the like.

According to a further embodiment of the present disclosure, the elevator system may comprise a second gas reservoir are separate from the first gas reservoir and adapted for storing pressurised gas, wherein the second gas reservoir may be arranged at the elevator car and wherein the gas reservoir may be arranged to provide pressurised gas to at least one of the at least one elevator car door and/or the at least one floor landing door, in particular to at least one floor landing door where the elevator car is currently arranged at, to allow the pneumatic operating the at least one elevator car door and/or the at least one floor landing door.

The second gas reservoir may be arranged in the vicinity of the elevator car and in particular attached to the elevator car and travelling with the elevator car. For example, the gas reservoir may be attached to the bottom of the elevator car, in particular the outside or underside of the car floor of the elevator car or may be arranged at the top of the elevator car or the elevator roof. The elevator system may comprise a connection mechanism that connects at least one of the elevator car door and the elevator floor landing door of a particular floor to the second gas reservoir where the elevator car is currently arranged at. In other words, the elevator car may arrive at a floor landing and may, by employing the connection mechanism, connect the second gas reservoir, e.g. via a pivotable pressure feed connecting to a suitable receptacle arranged at or near the floor landing door, to a pressure operated element of the floor landing door for actuating unlocking and/or opening of the floor landing door. In consequence, running a pressure feed from the first compressor to a respective pressure operated elements of a floor landing door, e.g. through the elevator shaft, may be avoided. Thereby, installation time and cost and space requirement in the elevator shaft may be reduced. Further, a clutch element for operating multiple door elements or parallel doors (car door and shaft door) in synchronization may not be needed anymore: e.g. the doors may be synchronized by applying gas pressure on both car and floor door simultaneously.

According to a further embodiment of the present disclosure, the second gas reservoir may be connectable to a pressure feed from the first gas reservoir for filling of the gas second gas reservoir and/or wherein a further compressor, in particular comprising a further electric motor, may be arranged at the elevator car for filling of the second gas reservoir.

For example, the elevator car may stop at a defined position in the elevator shaft, which position may or may not coincide with a floor landing position, and may employ a connection mechanism that connects a gas feed, e.g. arranged in the elevator shaft, to the second gas reservoir, for filling of the second gas reservoir. The connection mechanism may be the same that may also be used for connecting the second gas reservoir to a floor landing door as described previously. Alternatively, the connection mechanism may be separate from the connection mechanism that connects to the elevator floor landing door. The elevator car may thus stop at this defined position, the second gas reservoir may be connected to the first gas reservoir, in particular a gas feed arranged within the elevator shaft connected to the first gas reservoir by using the connection mechanism and may subsequently fill the second gas reservoir from the first gas reservoir and/or the compressor of the first gas reservoir. Further alternatively, the connection mechanism may be an electrical connection mechanism, connecting the compressor, in particular the electric motor of the compressor for filling the second gas reservoir with an electric source. This connection may be again a defined position in the elevator shaft, e.g. a dedicated position for connecting to the electric source and thus for powering the compressor for filling the second gas reservoir, or the electrical connection may be established at one, a plurality overall of the positions, where the elevator car is arranged at when serving a particular floor.

Alternatively, electric energy provided to the elevator car, e.g. via a travelling cable, may operate a further electric motor/a compressor for filling of the second gas reservoir.

According to a further embodiment of the present disclosure, the elevator system may further comprise a brake element adapted for decelerating the elevator car and/or for maintaining a position of the elevator car in the elevator shaft, wherein the brake element may be at least partially pneumatically operable.

The brake element may be acting on elements in the elevator shaft, e.g. a guide rail, in particular may clamp with brake pads or the like at least one guide rail of the elevator system. The braking mechanism may be actuated by applying pressurised gas, or the brake element may be arranged for breaking in the absence of the pressurised gas fed to the brake element. The latter would in particular constitute a fail-safe mechanism, in that in case of a feed rupture or the gas reservoir having a too low pressure, the brake operation is still assured. Likewise, e.g. when the elevator car is situated at floor landing, the position may be maintained simply by removing the feed of pressurised gas to the brake element, thereby activating the breaking and only deactivating the breaking when again feeding pressurised gas. Likewise, the brake element may be adapted to be switchable between two positions, a braking position and a non-breaking position by application of pressurised gas. In other words, the brake may be activated by a short feed of pressurised gas to the brake element, after which the brake maintains the braking force until a further application of pressurised gas, which then deactivates the breaking.

A brake element may be integrated into the pneumatic motor and may be activated by removal of operating pressure, e.g. by a drop in pressure from the pressurised gas or may be dedicatedly actuatable by pressed gas from the gas reservoir.

According to a further embodiment of the present disclosure, the elevator system may further comprise a generator for generating electric energy, wherein the generator may be pneumatically actuatable.

In other words, the elevator system may be adapted to generate its own electric energy by applying pressurised gas to the generator. The generator may be an additional or an alternative electrical energy source, separate from any external electrical energy feed. The elevator system may thus be self-contained and may not require a permanent external electrical energy feed. E.g., the only electrical energy fed to the elevator system may be used for actuating the electric motor of the compressor. Once the compressor, via the electric motor, has sufficiently filled the gas reservoir, any external electric feed may be disconnected and the elevator may be operable without any external electrical energy feed. In this regard, the elevator system may be independent of a permanent external electrical energy feed and may thus be usable even at times where there is a power outage which would normally prohibit the use of an elevator system. The electrical energy generated by the generator may thus be used to power all electric elements of the elevator system independently from an external electrical energy feed.

The sole generated electrical energy may be employed to power the processing element, operation of doors and/or breaks in case these are not pneumatically operated, or generally merely a control element controlling the operation of the elevator system. Additionally or alternatively a separate energy storage element, e.g. like a battery system, may be provided, which may in particular be chargeable by the generator, for powering the control of the elevator system/the elevator operation, but in particular not for powering the operation itself, i.e. not powering the elevator drive. The separate energy storage element may be recharged by electric energy from the generator, i.e. electricity generated from the pressurised gas, and/or from an external electric feed.

According to a further embodiment of the present disclosure, the elevator system may be a bit adapted to prohibit elevator operation in case the gas pressure of the gas reservoir is below a defined threshold value, wherein in particular the defined threshold value is indicative of a sufficient gas pressure to allow an evacuation of the elevator car.

In other words, the elevator system may only be operable when the gas reservoir has sufficient gas to assure the (normal) operation of the elevator system, in particular without risking a hazardous situation. In case it is determined that the gas pressure is not sufficient for normal operation, e.g. the gas pressure is at or below a defined threshold value, the elevator operation is deactivated. The threshold value may be set such that when it is determined that the gas pressure is (falling) below the threshold value, and orderly termination of the current travel of the elevator car is insured. The orderly termination may be either the stop of the elevator car at the next available floor landing or it may be arranged such that an arbitrary current elevator car travel can be completed normally. Further, the elevator system may be arranged such that an elevator car motion in a defined direction, e.g. depending on a weight imbalance between the elevator car and the counterweight may be performed without the application of pressurised gas, to allow an evacuation of elevator passengers even in the case of a malfunction or in case insufficient pressurised gas is available for normal completion of the elevator trip.

According to a further embodiment of the present disclosure, the elevator system may further comprise an emergency gas tank for providing pressurised gas to the pneumatic drive for evacuation of the elevator car and/or an inlet adapted for connecting an external gas source for providing pressurised gas to the elevator system, in particular the pneumatic drive for an evacuation of the elevator car.

The emergency gas tank of the elevator system may assure that in case the gas pressure drops below the threshold level of the gas reservoir, a current trip of the elevator system may be completed or at least the trip may complete at the next available floor landing. Likewise, in case of a malfunction of the gas reservoir and thus of the halting of the elevator car between floors, the emergency gas tank may be used, in particular on demand connectable, in a suitable manner to the feeds of the elevator system to provide pressurised gas from the emergency gas tank to the pneumatic elements of the elevator system to allow an emergency evacuation of passengers in the elevator car. Likewise, the elevator system may have an inlet for the connection of an external gas source to the feeds of the elevator system. This may allow for example a rescue operator, e.g. by connecting a portable pressurised gas tank, to connect the external gas source to the feeds of the elevator system for emergency evacuation purposes.

According to a further embodiment of the present disclosure, an external electrical energy feed may be exclusively connected to the electric motor of the compressor.

This, in particular in conjunction with the generator for generating electric energy, provides a self-sufficient or substantially energy independent elevator system, where mechanical energy is stored in the pressurised gas reservoir for mechanical and potentially also electrical operation of the elevator system. The external energy feed may be the electric grid, or may alternatively or additionally be and in particular local method of energy generation, e.g. an independent local method of energy generation like solar cells, wind energy, water energy and the like. This results in a great independent elevator system where the only energy storage is the pressurised gas in the gas reservoir.

In particular, it is also conceivable that the elevator does not rely on electrical energy for its operation. In case no electric energy is available, a suitable feed arrangement of pressurised gas feeds and controlled by pressure switches like suitable valves for directing and re-directing the pressurised gas within the feed arrangement may allow the operation of the elevator system completely without energy. For example the pressing of a floor landing the button may activate a mechanical valve which in turn suitably directs or applies pressurised gas within the feed arrangement resulting in the elevator car moving towards said landing. The same is conceivable for operating or activating a floor destination within the elevator car to disembark on.

According to a further embodiment of the present disclosure, the elevator system may comprise a heating element for heating the gas reservoir.

The pressure of a compressed gas depends on its temperature, which at least partly depends of the ambient temperature. In case the ambient temperature drops overtime, e.g. during some periods of the day or night, the pressure in the gas reservoir may likewise drop. A heating element may thus be provided to heat the gas reservoir, e.g. an external surface of a container, to heat the gas in the gas reservoir or at least maintain a defined temperature. Depending on the time of the day or on the days in a yearly cycle, more or less heating may be required. E.g. during summer, substantially no heating may be required whereas during winter a substantially continuous heating may be required. Likewise the heating may depend on the geographical location or the specific location within a building.

One way to implement a heating element is to include a resistance into or around the gas reservoir to maintain the temperature at a certain level to keep the pressure at the desired level. Similarly to the compressor, the heating element may be locally (e.g. over a temperature sensor) or remotely (over an IoT controller) controlled to coordinate the power demand of the heating element with the energy availability of the grid. The heating element may be an electrical heating element powered substantially from or through energy available from the power grid. Alternatively, or additionally, the heating element may be powered by energy generated from the pressured gas stored in the gas reservoir. E.g. the generator may be used to generate electrical energy from the pressurized gas to actuate the heating element.

E.g. in a simple low number floor elevator system, the only functions for controlling the elevator may be calling the elevator to a defined elevator floor on that floor and controls for moving the elevator up and down in the elevator shaft.

BRIEF DESCRIPTION OF THE DRAWINGS

The present invention will now be described with reference to the accompanying drawings, in which.

DETAILED DESCRIPTION

Figure 1:
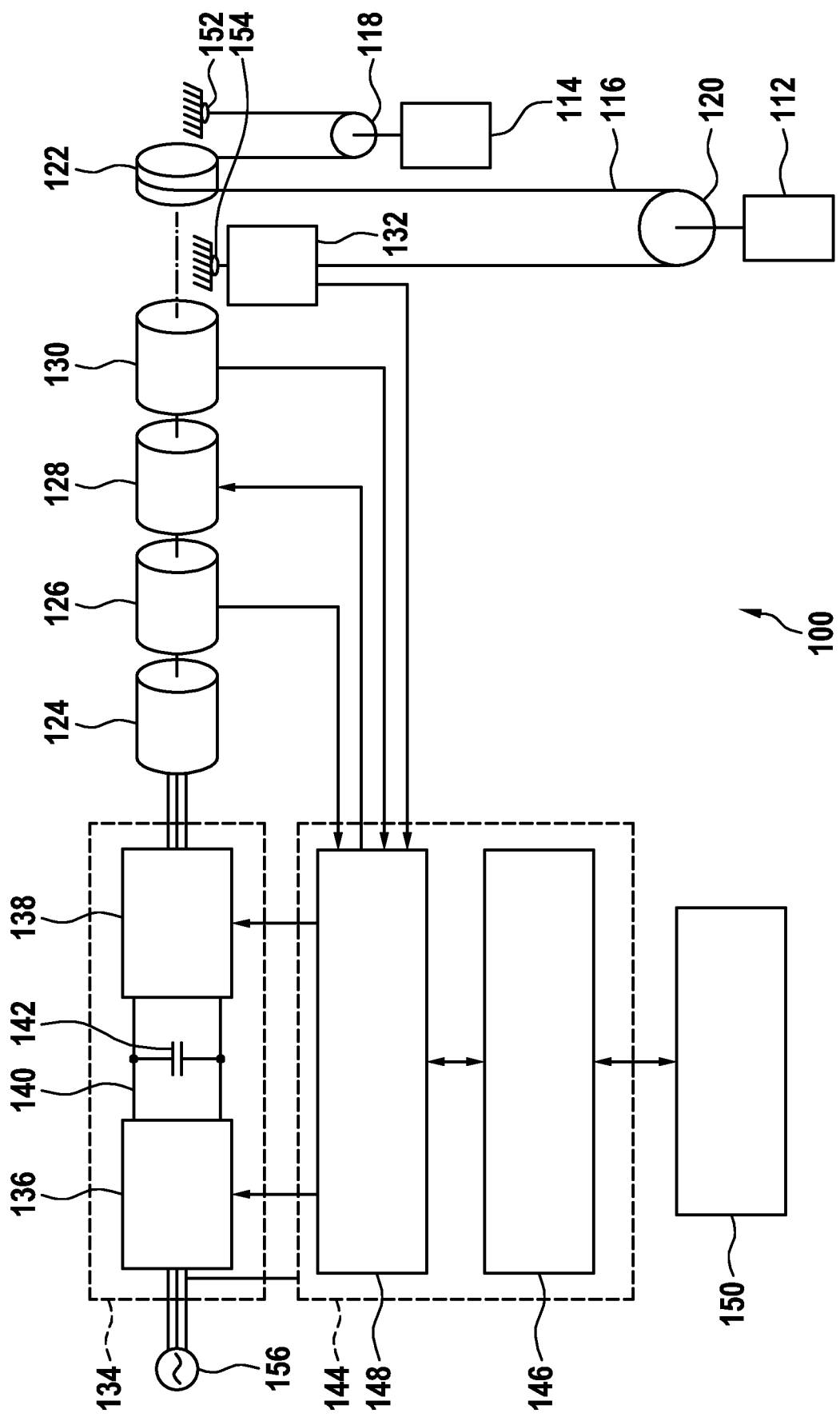
FIG. 1 shows an exemplary embodiment of an elevator system.

Now referring to FIG. 1, which shows an exemplary embodiment of an elevator system.

FIG. 1 is a block diagram of elevator system 100, which includes elevator car 112, counterweight 114, traction medium 116, pulleys 118 and 120, traction sheave 122, elevator drive 124, encoder 126, brake 128, brake sensor 130, load weighing device 132, regenerative drive 134 (including converter 136, inverter 138, and DC bus 140 with capacitor 142), controller 144 (including elevator control 146 and regenerative drive control 148), and user interface 150.

In FIG. 1, car 112 and counterweight 114 are suspended from traction medium 116 in a 2:1 traction medium configuration. Traction medium 116 extends from fixed attachment 152 downward to pulley 118, then upward over sheave 122, downward to pulley 120, and upward to load weighing device 132 and fixed attachment 154. Other traction medium arrangements may be used, including 1:1, 4:1, 8:1, and others.

Elevator car 112 is driven upward, and counterweight 114 is driven downward, when sheave 122 rotates in one direction. Elevator car 112 is driven downward and counterweight 114 is driven upward when sheave 122 rotates in the opposite direction. Counterweight 114 is selected to be approximately equal to the weight of elevator car 112 together with an average number of passengers (often estimated at 50% of a maximum load). Load weighing device 132 is connected to traction medium 116 to provide an indication of the total weight of elevator car 112 and its passengers. Load weighing device 132 may be located in a variety of different locations, such as a dead-end hitch, on traction medium 116, on top of elevator car 112, underneath the car platform of elevator car 112, etc. Load weighing device 132 may provide the sensed load weight to regenerative drive 134.

Traction sheave 122 is connected to elevator drive 124, which controls the speed and direction of movement of elevator car 112. Elevator drive 124 is, for example, a permanent magnet synchronous machine, which may operate as either a motor or as a generator. When operating as a motor, elevator drive 124 receives three-phase AC output power from regenerative drive 134 to cause rotation of traction sheave 122. The direction of rotation of elevator drive 124 depends on the phase relationship of the three AC power phases. Regenerative drive 134 receives power from main power supply 156, which can be a power utility grid for supplying single-phase or three-phase AC power to regenerative drive 134. Converter 136 converts the AC power to DC voltage on DC bus 140. DC bus 140 may include one or more capacitors 142, which stores power for one or more purposes, such as to smooth the power on DC bus 140. DC voltage on DC bus 140 is then converted back to, e.g. three-phase, AC power suitable for driving elevator drive 124.

When elevator drive 124 is operating as a generator, power moves in the opposite direction. Traction sheave 122 rotates elevator drive 124 and causes three-phase AC power to be delivered from elevator drive 124 to inverter 138 of regenerative drive 134. Inverter 138 converts the three-phase AC power to DC voltage on DC bus 140. Converter 136 then converts some or all of the DC voltage on DC bus 140 to three-phase AC power suitable for returning to main power supply 156. In the illustrated embodiment, regenerative drive 134 sends most of the regenerated power back to main power supply 156, with only a small amount of regenerated power saved on capacitor 142 of DC bus 140. In an alternative embodiment, regenerative drive 134 can return regenerated power to a second power supply such as an energy storage system (not shown) in lieu of, or in addition to, returning power to main power supply 156.

Controller 144 communicates with the various components in elevator system 110, including regenerative drive 134, encoder 126, brake 128, brake sensor 130, load weighing device 132, and user interface 150. Elevator control 146 of controller 144 receives inputs from an input device, such as user interface 150. User interface 150 can include user input devices such as hall call buttons and other input devices on a control panel within elevator car 112. Elevator control 146 determines direction in which elevator car 112 should move and the floors at which elevator car 112 should stop. Elevator control 146 then delivers control signals to regenerative drive control 148. Regenerative drive control 148 then provides signals to regenerative drive 134 that control when and in what direction to drive elevator car 112 and also control when to lift brake 128 to allow movement of elevator car 112, and when to drop brake 128 to limit movement of elevator car 112.

Brake 128 prevents rotation of motor 124 and traction sheave 122. Brake 128 is an electrically actuated brake that is lifted or maintained out of contact with the motor shaft when power is delivered to brake 128 by regenerative drive 134. When power is removed from brake 128, it drops or engages the shaft of elevator drive 124 (or an attachment to the shaft) to prevent rotation. Brake sensor 130 monitor the state of brake 128, and provide inputs to regenerative drive 134.

Encoder 126 is mounted on the shaft of elevator drive 124 and provides encoder signals to regenerative drive control 148. The encoder signals allow regenerative drive 134 to achieve proper phase relationship between stator currents and rotor magnets, usually referred to as field orientation. Encoder 126 also provides encoder pulses to provide velocity feedback, so that the actual elevator velocity can be controlled to follow dictated velocity.

Figure 2A:
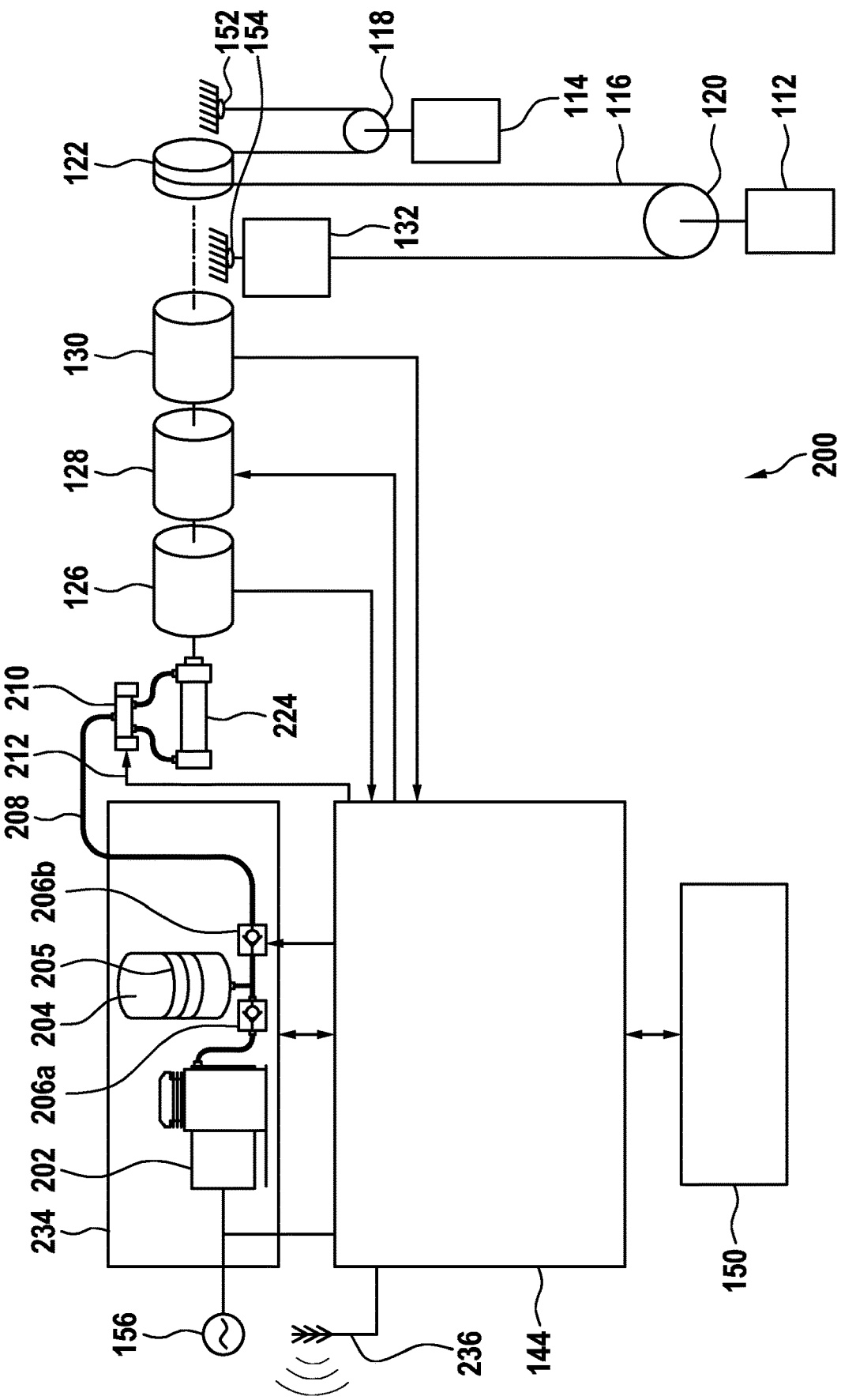
FIGS. 2*a,b,c* show exemplary embodiments of an elevator system according to the present disclosure.

Now referring to FIG. 2a, which shows an exemplary embodiment of an elevator system according to the present disclosure.

Elevator system 200 depicted in FIG. 2a is substantially comparable to the elevator system 100 depicted in FIG. 1, with the exception that the elevator system 200 is embodied as pneumatic elevator system 200. The pneumatic elevator system 200 comprises a numeric arrangement 234 that is connected to the main power supply 156. Main power supply 156 is exemplarily depicted as a single phase connection to the power grid, but may very well be embodied as a multiphase, e.g. a three phase, connection to the power grid. Likewise, additionally or alternatively, a connection to an alternative power source, e.g. a separate solar power source, may be provided.

The power feed of the main power supply 156 is connected in the pneumatic arrangement 234 to a compressor 202. Compressor 202 may be a common compressor comprising an electric motor connected to the main power supply 156. The electric motor is not separately depicted in FIG. 2a. By electrically powering the electric motor, the compressor is compressing gas, here exemplarily air available, and feeding the compressed gas to gas reservoir 204 for storage. The electric motor regularly actuates a pump which compresses the gas, raising it to a higher pressure and feeding the pressurised gas via a gas feed to gas reservoir 204. Between the compressor 202 and the gas reservoir 204 a valve 206a, e.g. a check valve 206a, may be arranged. The check valve 206 is a one-way valve that allows pressurised air to travel in the pneumatic system in a first direction but prevents backflow in a second direction, opposite the first direction, or loss of pressure into the compressor when the compressor 202 is stopped.

A further valve 206b may be arranged between the gas reservoir 204 and the drive valve 210. Valve 206b may be a valve that may be opened and closed by a control signal or control the heater from controller 144. When closed, valve 206b separates the gas reservoir 204 from the drive valve 210. In this condition, when the compressor 202 is feeding compressed gas towards the gas reservoir 204, the gas reservoir 204 is filled with the compressed gas coming from compressor 202. The gas reservoir 204 may comprise a pressure sensor connected to controller 144, not depicted in FIG. 2a, for determining a current pressure in the gas reservoir 204, to allow activation and deactivation of compressor 202 for filling the gas reservoir 204. In particular where the pressure sensor/controller 144 detects a pressure comparable to a substantially full or maximum pressure of the gas reservoir 204, controller 144 may deactivate compressor 202. With the deactivation of compressor 202, valve 206a closes, thereby separating the compressor 202 from the gas reservoir 204.

By opening the valve 206b, the gas stored in the gas reservoir 204 may be fed to the drive valve 210. Exemplarily depicted in FIG. 2a, the drive valve 210 comprises an inlet and two outlets and is connected to a pneumatic drive 224 also comprising two inlets connected to the two outlets of the drive valve 210. The controller 144 may now operate pneumatic drive 224, in particular the direction of rotation of pneumatic drive 224 and thus the rotation of the traction sheave 122, which in turn results in a raising or lowering of the elevator car 112 in the elevator shaft. Drive valve 210 may control the flow of pressurised gas from the source, either directly from the compressor 202 or from the gas reservoir 204 towards the pneumatic drive 224. Controller 144 may control the drive valve 210 such that an opening or closing of one of the two outlets and closing or opening of the other one of the two outlets results in a dedicated feed of pressurised gas from the gas reservoir 204 to one of the two inlets of the pneumatic drive 224. Depending on which inlet of the pneumatic drive 224 receives the pressurised gas from the drive valve 210, the pneumatic drive 224 is turning in one or the other directions for raising or lowering the elevator car 112.

Likewise it is conceivable that valve 206b is functionally or physically incorporated in drive valve 210. Accordingly, it may be sufficient to have only the drive valve 210 and substantially omit valve 206b. Also, it is conceivable to have substantially two valves 206b, which are independently controllable by controller 144, where each valve 206b is connected to one of the inlets of pneumatic drive 224. In such a scenario, drive valve 210 may be substituted by two separately controllable valves 206b each providing pressure to one of the inlets of the pneumatic drive 224.

Controller 144 comprises a communication element 236, in FIG. 2a exemplarily depicted as antenna element for communicatively connecting the elevator system 200, in particular the controller 144, to a further communication entity. The further communication entity may be arranged in the vicinity, e.g. in the same building as elevator system 200, or may be arranged distant from the elevator system 200. The further communication entity may in particular be arranged connected to a local or global communication network, e.g. a building network or the Internet and be a communicative connection with the elevator system 200. Communication element 236 may in particular be used to receive instructions for operation of the elevator system 200, information regarding a current energy supply, energy demand and energy cost, and may transmit data, in particular operational data of the elevator system to a further communication entity. Thereby, the elevator system may be connected to an Internet of Things network (I network).

Compressor 202 may likewise comprise at least two electric motors for filling the gas reservoir, one electric motor being a single phase electric motor or low-power electric motor connected to a single phase main power supply, while a further electric motor is in particular a multiphase electric motor or high power electric motor connected to a multiphase main power supply, e.g. a three phase main power supply.

The pneumatic drive 224 may also act as a gas feed to the gas reservoir 204 in that a weight imbalance between the elevator car and the counterweight results in a movement of the elevator car versus the counterweight substantially without it being driven by the pneumatic drive 224. Such may result in the pneumatic drive 224 acting as a compressor and feeding pressurised gas to the gas reservoir 204. In particular the drive valve 210 and the valve 206b may need to be adapted appropriately to allow such an operation.

The basic functionality of control of the elevator system 200 of FIG. 2a is substantially comparable to the basic functionality of the elevator system 100 of FIG. 1. It is of course under to be understood that elements of elevator system 100, that are not required in the context of the pneumatic elevator system 200 may be omitted. Such may be in particular converter 136, inverter 138, DC bus 140, capacitor 142 and regenerative drive control 148. Instead of the regenerative drive controller 148, a drive controller arranged for connecting to and driving the pneumatic arrangement 234, the drive valve 210 and the pneumatic drive 224 may be provided. However, select elements which potentially operates electrically in the elevator system 100 of FIG. 1 may be embodied as pneumatically operated elements in the elevator system 200. For example, brake 128 may be operated pneumatically, e.g. fed from gas reservoir 204.

Figure 2B:
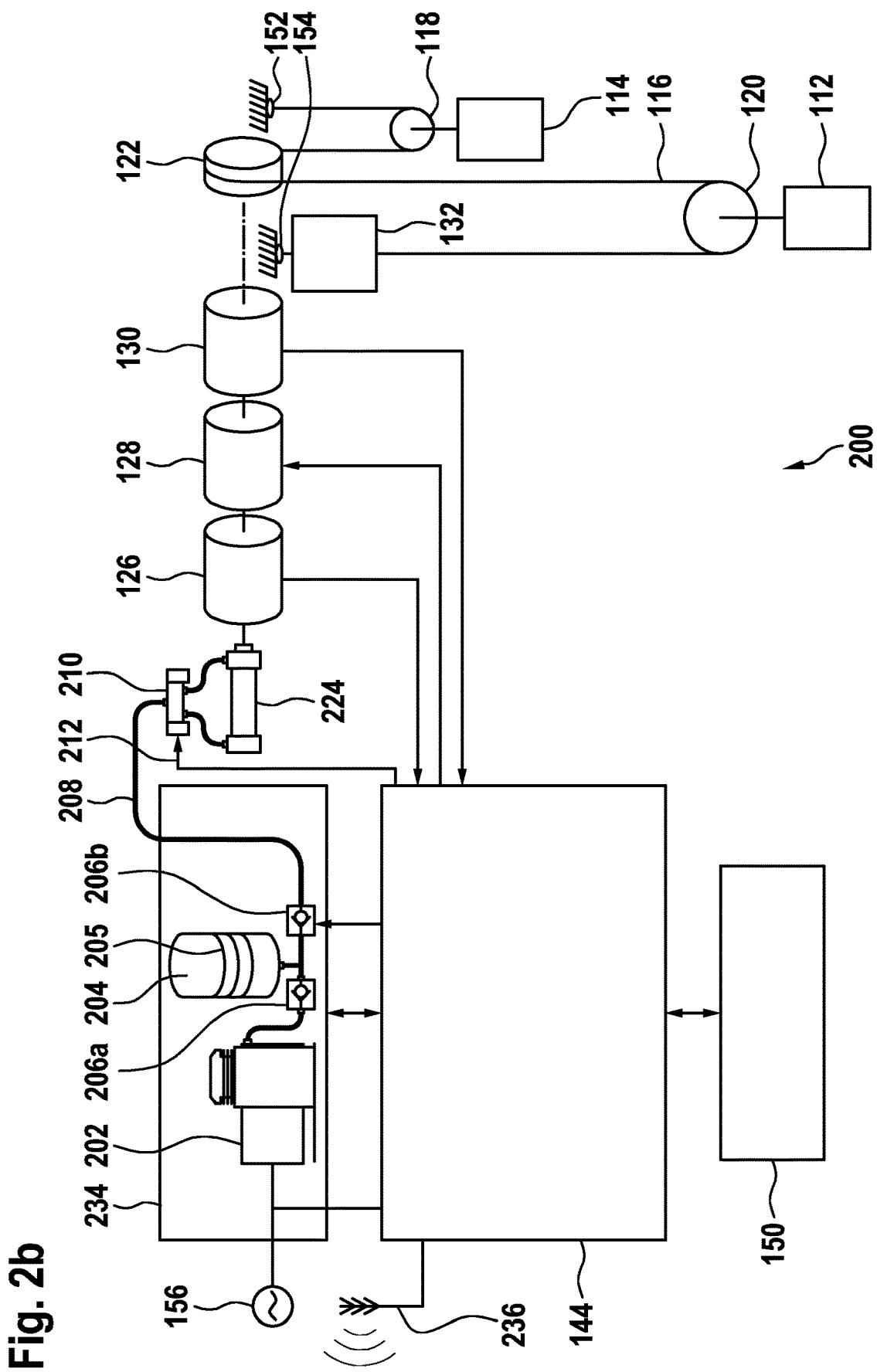

Now referring to FIG. 2b, which shows a further exemplary embodiment of an elevator system according to the present disclosure.

The elevator system 200 of FIG. 2b correspond in substance regarding the driving of the elevator car 114 way the elevator system of FIG. 1 in that an electric motor 124 connected to exemplary a regenerative drive 134 is employed for raising and lowering of the elevator car. In addition to the common elevator drive, the elevator system 200 of FIG. 2B comprises a numeric arrangement 234 as described in relation to FIG. 2 *a*. In FIG. 2B, the main power supply 156a of the regenerative drive 134 is depicted exemplarily as a three phase connection to the power grid while the main power supply 156b connected to the pneumatic arrangement 234 is depicted exemplarily as a single phase connection to the power grid.

The elevator system in FIG. 2b comprises a pressure feed 240 from the gas reservoir 204, connecting the gas reservoir 204 to a generator 238. A further valve 206c, controllable e.g. by controller 144, is provided for activating and deactivating a pressure feed of pressurised gas from gas reservoir 204 to generator 238. By the pressurised gas fed to generator 238, the generator 238 in turn generates electrical energy, which is fed to consumers of the elevator system 200 via electric feed 242, in FIG. 2b exemplarily controller 144. In FIG. 2b, only the compressor 202 is connected to the main power supply 156 receiving of electrical energy from the power grid, while substantially all electrical energy required for operation, i.e. controlling, of the elevator system 200 is generated by generator 238 from the pressurised gas. This allows a substantially independent controlling of the elevator system 200 by the gas stored in gas reservoir 204. In other words, as long as sufficient pressurised gas is stored in the gas reservoir 204, the elevator system is able to operate independent from any external electrical power supply. Such allows operation of the elevator system 200 even in the event of a power outage where no electrical energy is available through the main power supply 156. Of course, in this scenario a power feed from main power supply 156a is still required to drive the elevator drive 124 for moving the elevator car 114.

Now referring to FIG. 2c, which shows a further exemplary embodiment of an elevator system according to the present disclosure.

FIG. 2c shows a combination of the elevator systems as described in FIGS. 2a and 2b. Specifically, an elevator system is shown comprising a pneumatic motor 224 and a generator 238 connected to gas reservoir 204. Gas reservoir 204 is connected via valve 206a and pressure feed 208 to drive valve 210 as depicted in FIG. 2a, while a separate pressure feed via valve 206b and pressure feed 240 is connected to generator 238. Generator 238, comparable to the embodiment described in FIG. 2b, generates electric energy, which is provided via an electric feed 242 to further elements of the elevator system that require electric energy for their operation, here e.g. controller 144. In such an elevator system, any element requiring electric energy may be powered by the electric energy generated by generator 238. It may even be conceivable that generator 238 powers a generative drive system 134 and/or an electric drive 124. This embodiment of FIG. 2c comprises exemplarily a single pneumatic arrangement 234 feeding both drive valve 210/pneumatic drive 224 and generator 238.

Alternatively, not depicted in the embodiment of FIG. 2c, separate pneumatic arrangements may be provided, which separately feed drive valve 210/pneumatic drive 224 and generator 238. Likewise, it is conceivable to have a single compressor 202 feeding two gas reservoirs, with each gas reservoir being connected individually and separately to drive valve 210/pneumatic drive 224 and generator 238, respectively.

Figure 3:
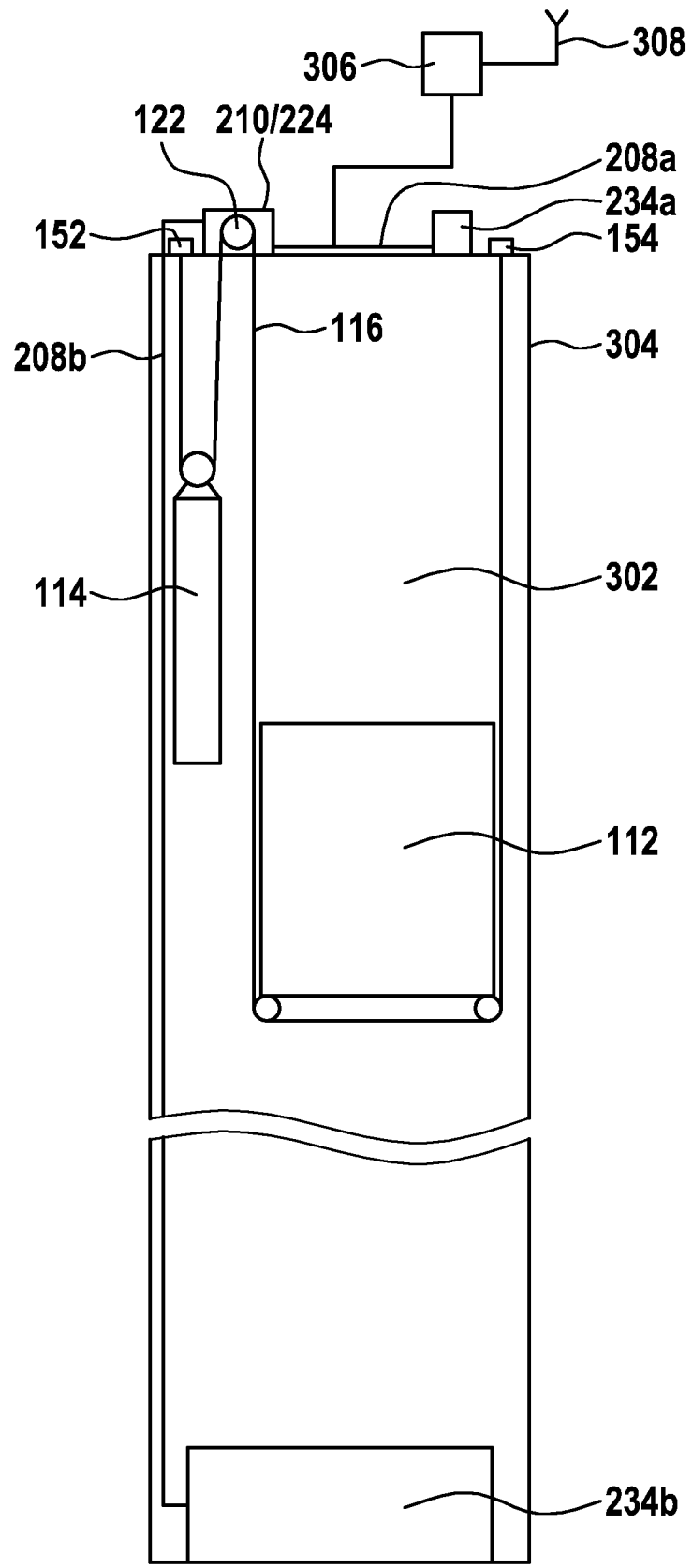
FIG. 3 shows an exemplary embodiment of an elevator system in an elevator shaft according to the present disclosure.

Now referring to FIG. 3, which shows an exemplary embodiment of an elevator system in an elevator shaft according to the present disclosure.

FIG. 3 shows elevator system 200 in an exemplary arrangement in the elevator shaft 302. Elevator shaft 302 comprises walls 304. The traction and suspension arrangement of elevator system 200 is comparable to what was depicted in FIGS. 1 and 2. FIG. 3 shows the arrangement of two options for the pneumatic arrangement 234, one arrangement where the pneumatic arrangement 234a is located at the top of the elevator shaft, e.g. in a dedicated machine room. Alternatively, pneumatic arrangement 234b is arranged in the elevator pit. The elevator car 112 is suspended differently than depicted in FIGS. 1 and 2, namely in FIGS. 3 to 5, the cabin is underslung, whereas in FIGS. 1 and 2, a pulley arranged above the cabin roof is connected to elevator car 112 for suspending the elevator car 112 in the elevator shaft 302.

Both the pneumatic arrangement 234a and then pneumatic arrangement 234b are depicted to be connected to the drive arrangement comprising drive valve 210 and pneumatic drive 224. With regard to pneumatic arrangement 234a, a pressure feed 208a is connected from the pneumatic arrangement 234a to the drive arrangement. Likewise, a pressure feed 208b is connecting pneumatic arrangement 234b to the drive arrangement. Here, pressure feed 208b is exemplarily installed in the elevator shaft running from the elevator pit to the top of the elevator shaft, for connection with the drive arrangement comprising the drive valve 210 and the pneumatic drive 224. Controller 144 and user interface 150 are not depicted in FIG. 3, but may be arranged at a suitable position in the elevator system.

While FIG. 3 depicts both a pneumatic arrangement 234a and both a pneumatic arrangement 234b, it is to be understood that normally only one of the two pneumatic arrangements 234a,b is provided. Exceptionally, both pneumatic arrangements 234a,b may be provided. The drive arrangement 210/224 is depicted at the top of the elevator shaft. However, it is conceivable that the drive arrangement 210/224 is also arranged in the elevator pit and connected to one of the two pneumatic arrangements 234a,b depicted. Thus, the drive arrangement 210/224 may be arranged in the elevator pit and connected to pneumatic arrangement 234a.

FIG. 3 shows an emergency gas tank or emergency gas reservoir 306, which is exemplarily connected between the pneumatic arrangement 234a and the pneumatic drive 224. The emergency gas reservoir 306 may be used for driving the elevator system in case the gas reservoir 204 is below a minimum threshold level for operation. It is also conceivable that the emergency gas reservoir is used for an emergency evacuation of passengers in the elevator car 112, e.g. to bring the elevator car 112 which may be stuck between floors, to the next available floor landing. Alternatively or additionally, an inlet 308 is depicted, for connection of an external emergency gas tank. E.g. emergency operators arriving at the elevator system may have a portable gas tank that is connectable to the inlet 308 to allow an emergency evacuation of passengers in the elevator car 112, e.g. to bring the elevator car 112 to the next available floor landing. The drive arrangement 210/224 further comprises an encoder 126 and a break 128, which however are not depicted separately in FIG. 3. Now referring to FIG. 4, which shows a further exemplary embodiment of an elevator system in an elevator shaft according to the present disclosure.

Figure 4:
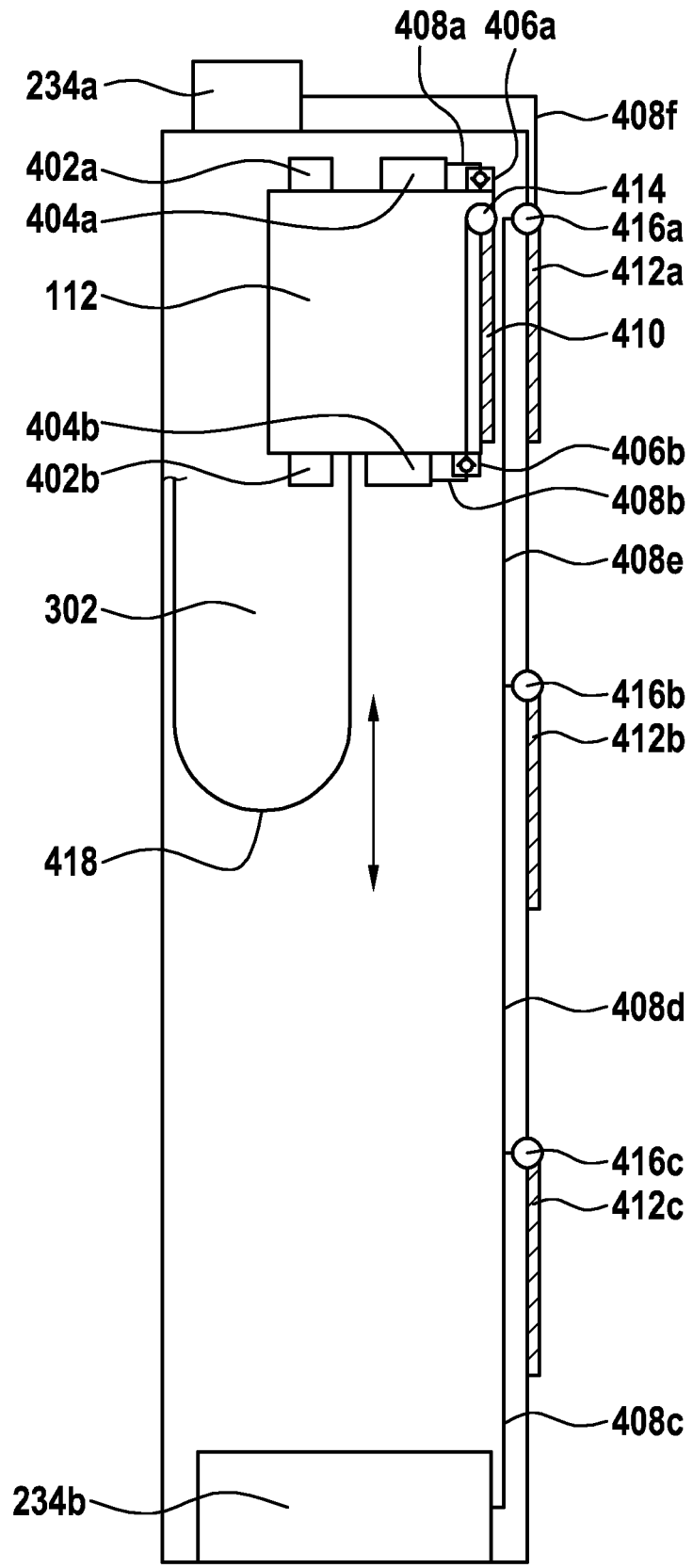
FIG. 4 shows a further exemplary embodiment of an elevator system in an elevator shaft according to the present disclosure.

The elevator system shown in FIG. 4 corresponds to the elevator system shown in FIGS. 2 and 3. The elevator system depicted in FIG. 4 comprises exemplarily three more landings. However, more or less floor landings are conceivable and well within the teachings of the present disclosure. Additionally, the elevator door and the floor landing door may be actuated by pressurised gas as well to operate the floor landing doors, one of the pneumatic arrangements depicted, either a pneumatic arrangement 234a arranged at the top of the elevator shaft or a pneumatic arrangement 234b arranged at the bottom of the elevator shaft may be connected using pressure feeds 408c,d,e,f to floor landing door mechanisms 416a,b,c. By pressurising, i.e. feeding pressurised gas to a respective floor landing door mechanism, the mechanism may be actuated to open and/or close the respective floor landing door 412a,b,c. In other words, once the elevator car 112 is situated appropriately at a respective floor landing, pressurised gas may be fed to the respective floor landing door mechanism 408c,d,e,f for opening and closing of the floor landing door 412a,b,c. Dedicated valves for controlling the flow of the pressurised gas are not depicted in FIG. 4. Such valves, or the feeding of the pressurised gas itself, may in particular be controllable by controller 144. In other words controller 144 may control the opening and closing of the floor landing doors 412a,b,c by controlling the feed of pressurised gas to the floor landing door mechanisms 416a,b,c. It may be conceivable to have a dedicated pressure feed connecting a pneumatic arrangement 234a,b, its gas reservoir 204, individually with a floor landing door mechanism 416a,b,c, or likewise a single pressure feed may run through the length of the elevator shaft 302 with dedicated branches, in particular valve-controlled, branching off from the pressure feed to the respective floor landing door mechanisms 416a,b,c.

Further, elevator car 112 comprises a separate second gas reservoir 404a,b, and in particular a separate, second compressor 402a,b. Exemplarily in FIG. 4, two locations for a second gas reservoir 404a,b and a second compressor 402a,b are depicted. E.g., in arrangement on top of the elevator car or alternatively attached to the bottom of the elevator car is conceivable. Also, one element of the second gas reservoir 404a,b and the second compressor 402a,b may be arranged at the top of the elevator car while another element may be arranged at the bottom of the elevator car. A pressure feed 408a,b runs from the second gas reservoir 404a,b to an elevator car door mechanism 414. A valve 406a,b controls the feed of pressurised gas to the elevator car door mechanism 414, for opening and closing of the elevator car door 410. Valve 406a,b may be controlled by controller 144 to operate the opening and closing of the elevator car door 410 during operation of the elevator system 200.

The second compressor 402a,b may comprise an electric motor, not depicted in FIG. 4, for filling of the second gas reservoir 404a,b with the pressurised gas. The electric motor of the second compressor 402a,b may be actuated by electric energy received from the main power supply 156 or generated by generator 238. Electric energy may in particular be fed to the elevator car 112 via a suitable electrical connection, e.g. in the travelling cable 418 connecting the elevator car 112 to controller 144.

Further, it is also conceivable that a respective floor landing door mechanism 416a,b,c is fed compressed air originating from the second gas reservoir arranged at the elevator car 112. This may result in no dedicated pressure feed from pneumatic arrangement 234a,b to the floor landing door mechanism 416a,b,c being required. Rather, a temporary pressure feed, e.g. a pivotable arm swivelling out from the elevator car 112 and connecting with a suitable connector of the respective floor landing door mechanism 416a,b,c integrated in or arranged in the vicinity of the respective floor landing door mechanism 416a,b,c may be established. Such a mechanism further increases the reliability and safety of the elevator system as only the respective floor landing door mechanism 416a,b,c where the elevator car 112 is currently arranged at is operable, since without the temporary pressure feed connected to the respective floor landing door mechanism 416a,b,c, a floor landing door mechanism 416a,b,c may not be actuated and thus the related floor landing door may not open/close.

Figure 5:
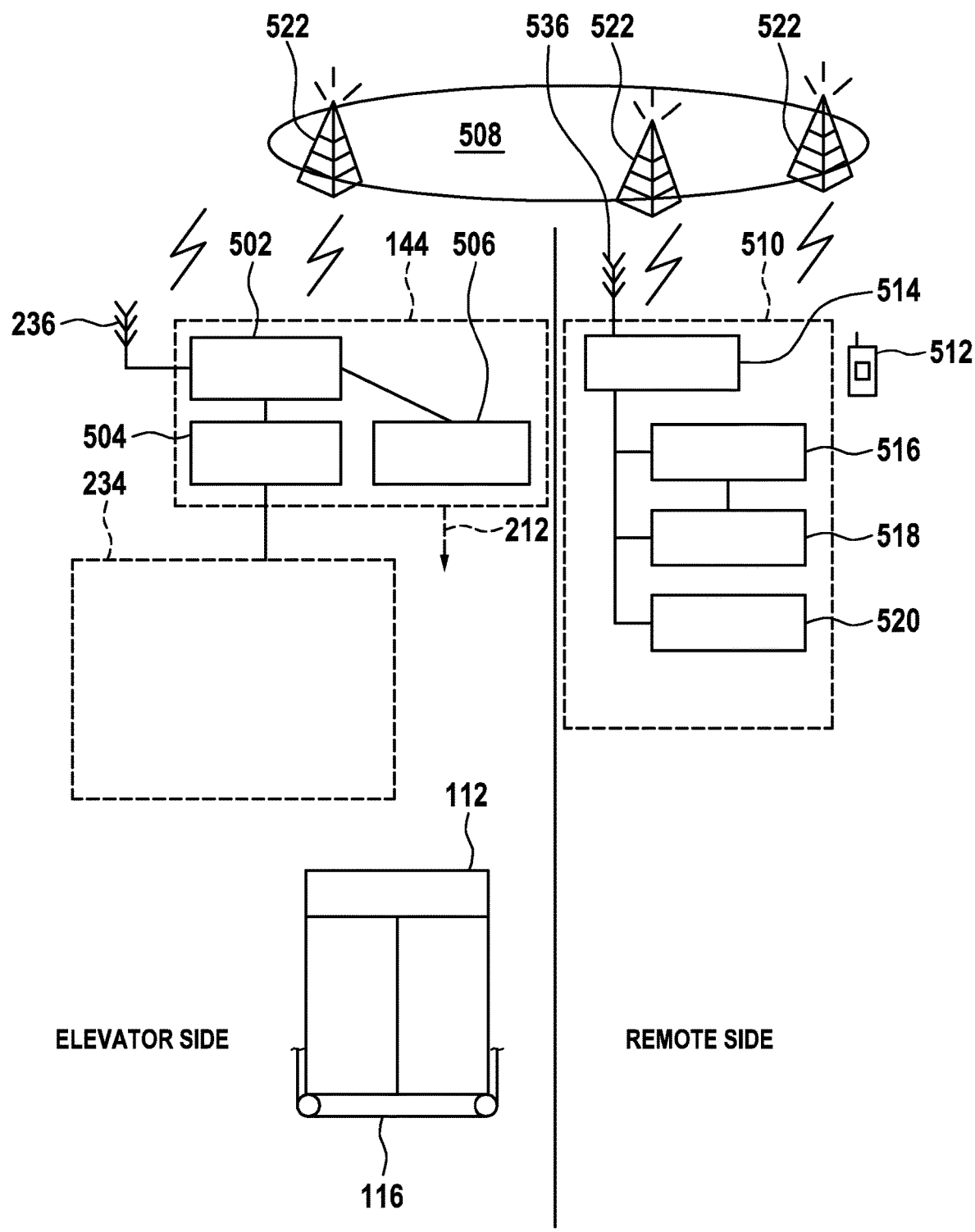
FIG. 5 shows an exemplary embodiment of a communications connectivity diagram for an elevator system according to the present disclosure.

Now referring to FIG. 5, which shows an exemplary embodiment of a communications connectivity diagram for an elevator system according to the present disclosure.

FIG. 5 shows a communication scenario with an elevator side and a remote side. The elevator side and the remote side are connected by a network 508, e.g. the Internet or a private network, e.g. a VPN connection through an openly accessible network like the Internet. Connectivity in FIG. 5 is exemplarily realised wirelessly using e.g. a mobile communication network employing cell towers 522 which communicatively connected with communication element 236 of the elevator system on the elevator side and a communication element 536 of a management system 510 on the remote side. Controller 144 comprises a wireless communication element 502, to which the communication element 236, e.g. an antenna, is connected to. The wireless communication element 502 is adapted for receiving and sending information and instructions wirelessly wire network 508 to a remote recipient, e.g. management system 510.

Instructions received by wireless communication element 502 are processed with a pneumatic arrangement control element 504 and/or a drive control element 506. The pneumatic arrangement control element 504 is connected to pneumatic arrangement 234 of FIG. 2a for controlling the operation of at least compressor 202. Likewise, the drive control element 506 is arranged to control via the drive valve control 212 at least the drive valve 210 and thereby the operation of the pneumatic drive 224. In other words, by controlling the filling of the gas reservoir 204 by compressor 202 as well as controlling the removal of compressed air from the gas reservoir 204 by drive valve 210, an operation of the elevator system, i.e. the raising and lowering of elevator car 112, may be controlled. Further control functionality, e.g. receiving a pressure value from a pressure sensor of the gas reservoir 24 and/or controlling a heating of the gas reservoir 204 by heating element 205 is not further described in relation to FIG. 5 here.

On the remote sites exemplarily a management system 510 is arranged. Management system 510 comprises exemplarily at least a wireless communication element 514 connected to communication element 536 and further comprises a database management element 516, a database 518 and a remote control element 520. Remote control element 520 may access via the database management element 516 information stored in database 518. Database 518 may contain information on how a particular elevator system is to be controlled and may further contain information regarding a controlling of the filling of gas reservoir 204 by activating and deactivating compressor 202, its electric motor. Said controlling of the filling of the gas reservoir 204 may comprise information about a current energy availability and/or energy cost and may thus control the filling dependence on the availability and/or cost. Likewise, the remote control element 520 may have access to historic trip data of a particular elevator system for anticipating or calculating, e.g. by a machine learning algorithm or an artificial intelligence algorithm, a future energy demand and/or future trip data anticipating a future use of the elevator system, and thereby, dependent on said anticipated or calculated future use, control the filling of the gas reservoir 204. Required information, e.g. history trip data and/or energy availability data/cost data may be stored in database 518 or may be available from a further remote location via network 508.

The just describes anticipation/calculation of a future energy demand may in a similar manner be performed by controller 144. For that, controller 144 may comprise its own database, not depicted in FIG. 5, or may access database 518 via network 508.

Further depicted in FIG. 5, a mobile device 512 is provided for e.g. controlling the operation of elevator system 200, in particular controller 144, remote control element 520 and specifically, the filling of the gas reservoir 204 and/or the general operation of the elevator system, i.e. the control of the elevator car 112. Using mobile device 512, a user, in particular of elevator system 200, may control the above described functionality, in particular the filling of the gas reservoir 204 while exemplarily being able to monitor a current energy availability and/or energy cost.

Figure 6:
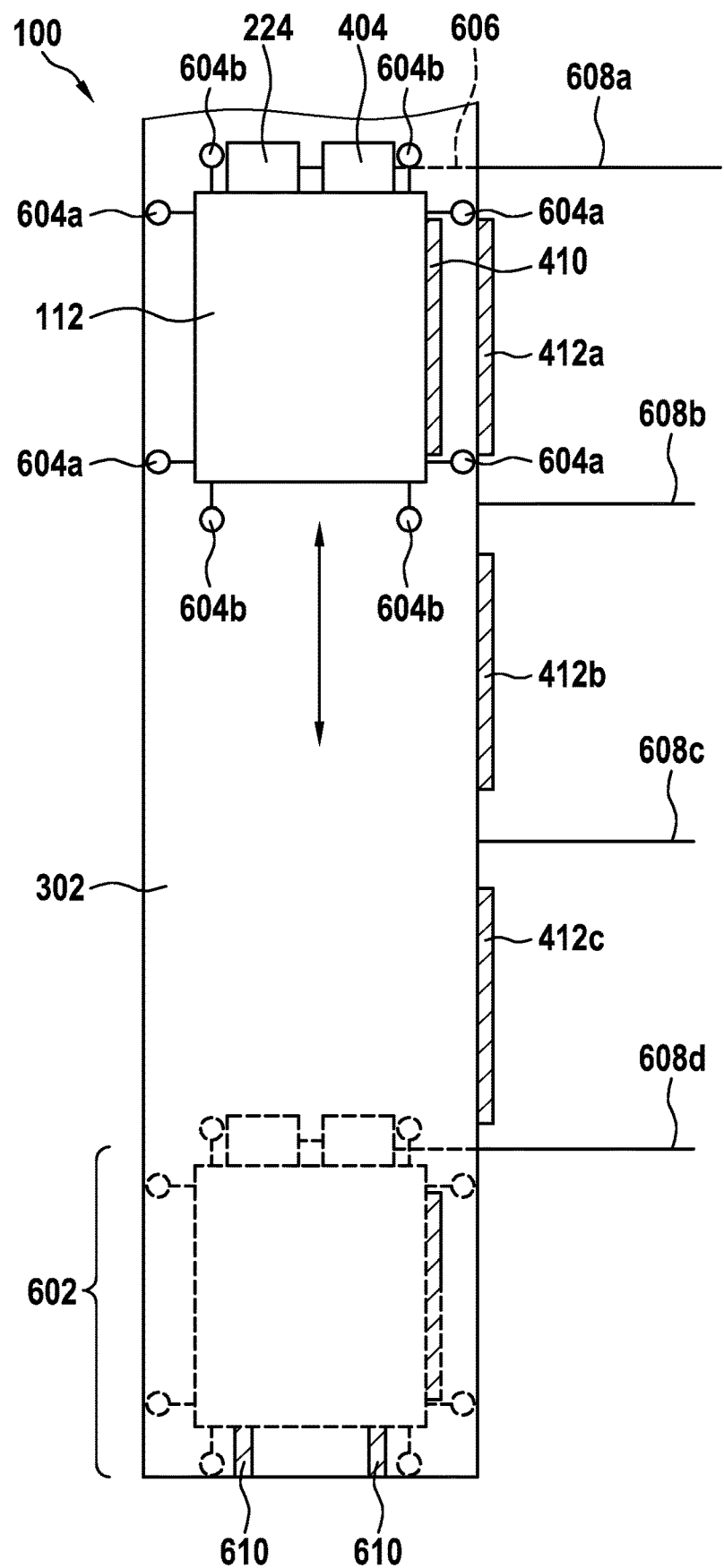
FIGS. 6 to 8 shows exemplary embodiments of an elevator system with self-supporting elevator cars.

Now referring to FIG. 6, which FIG. 6 shows an exemplary embodiment of an elevator system with a self-supporting elevator car.

The elevator system 200 comprises an elevator car 112 arranged in an elevator shaft 302. The elevator car 112 is a self-supporting elevator car 112, which is accommodated within the elevator shaft by shaft support arrangement 604a. The shaft support arrangement 604a is exemplarily embodied as a plurality, here exemplarily four, wheels that contact the surface of the walls of the elevator shaft 302, thereby suspending the elevator car 112 within the elevator shaft. By turning the wheels of shaft support arrangement 604a, the elevator car 112 may be raised of lowered within the elevator shaft 302. In order to move the elevator car 112 within the elevator shaft 302, at least one of the wheels of the shaft support arrangement 604a may be actuated.

The actuation energy may be provided by the pneumatic elevator drive 224. The specific connection from the pneumatic elevator drive 224 to the wheels of the shaft support arrangement 604a is not depicted. The energy transfer may either be provided by turning at least one of the wheels of the shaft support arrangement 604a by the pneumatic elevator drive 224, either directly or via a gearbox to adjust or match rotational force and/or rotational speed to a setting appropriate for the at least one actuated wheel of the shaft support arrangement 604a, or by providing a suitable transmission, e.g., using a drive belt or drive chain connecting the output of the pneumatic elevator drive 224 with the at least one actuated wheel of the shaft support arrangement 604a. Alternatively, all wheels of the shaft support arrangement 604a may be actuated by the pneumatic elevator drive 224 via at least one drive belt or drive chain.

The elevator car accommodates the pneumatic elevator drive 224 and a gas reservoir 404. In FIG. 6, both the pneumatic elevator drive 224 and a gas reservoir 404 are arranged on the roof or top of the elevator car 112. Other positions, e.g., affixed to the bottom of the elevator car 112, are conceivable. External pressure feeds on the different floors are depicted as pressure feed 608a,b,c,d. It is conceivable that the elevator system 200 comprises only one dedicated pressure feed at a defined floor, as opposed to pressure feeds throughout the elevator system, possibly on every floor. E.g., the elevator system may comprise a dedicated refilling position, in FIG. 6 exemplarily in the elevator pit 602, where the elevator car 122 rests on a dedicated pit support 610. The dedicated pit support 601 provides a defined positioning of the elevator car 122, so that a pressure feed 608d can be connected to the elevator car 122, i.e., connected to and disconnected from the gas reservoir 404 in a reliable and repeatable manner by assuring a similar position of the elevator car 122 when resting on the pit support 610. The pit support 610 may thus provide a self-centring functionality.

The gas reservoir is refillable by a pressure feed 606, which is only schematically depicted in FIG. 6. The pressure feed 606 bridges the gap between the gas reservoir 404 and a respective pressure feed 608a,b,c,d, i.e. connects the external pressure feed 608a,b,c,d to the gas reservoir 404. Once connected, the gas reservoir can be refilled. A pressure sensor, not depicted in FIG. 6, may determine the pressure in the gas reservoir 404, the pressure feed 606 and/or pressure feed 608a,b,c,d, and stops delivery of pressurized gas to the gas reservoir 404, either by stopping the feed from the pressure feed 608a,b,c,d and/or by disconnecting the pressure feed 606 from either or both the gas reservoir 404 and the pressure feed 608a,b,c,d. A second shaft support arrangement 604b, exemplarily a second set of wheels, is depicted in FIG. 6. There are not arranged sideways of the elevator car 112, to accommodate the elevator car 112 in a horizontal shaft, but on the outside of the top and bottom of the elevator car 112 to accommodate the elevator car 112 in a vertical shaft. As described before, at least one of the wheels may be actuated by the pneumatic elevator drive 224 to move the elevator car 112, here in the horizontal direction in a horizontal elevator shaft.

Figure 7:
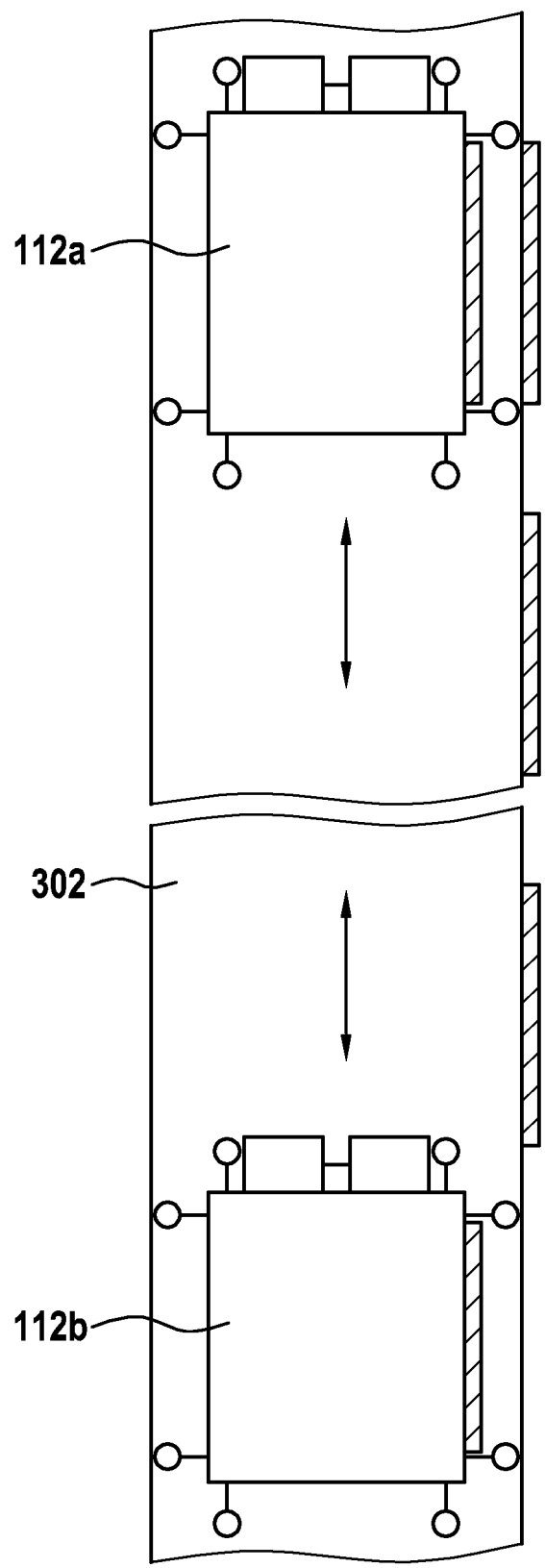

Now referring to FIG. 7, where an exemplary embodiment of an elevator system is shown having a plurality of self-supporting elevator cars in the same shaft.

In FIG. 7, exemplarily to elevator cars 112a, 112b are arranged in the same elevator shaft 302. Elevator car 112a operates above elevator car 112b. Thus, this the operation of elevator car 112a is limited by the roof of the elevator shaft 302 and the current or future position of the elevator car 112b. In case the elevator car 112b is arranged at the lowest possible position in the elevator shaft 302, the elevator car 112a may substantially operate within the full elevator shaft 302. Likewise, in case the elevator car 112a is arranged substantially at the top of the elevator shaft 302, the elevator car 112b may likewise substantially operate within the full elevator shaft 302. Operating a plurality of elevator cars within the same elevator shaft may preferably be realized by the self-supporting elevator cars in that self-supporting elevator cars do not need a suspension medium that would otherwise block the travel. Likewise it is conceivable that the elevator car 112a is a common elevator car using a traction and suspension medium while elevator car 112b is a self-supporting elevator car.

Figure 8:
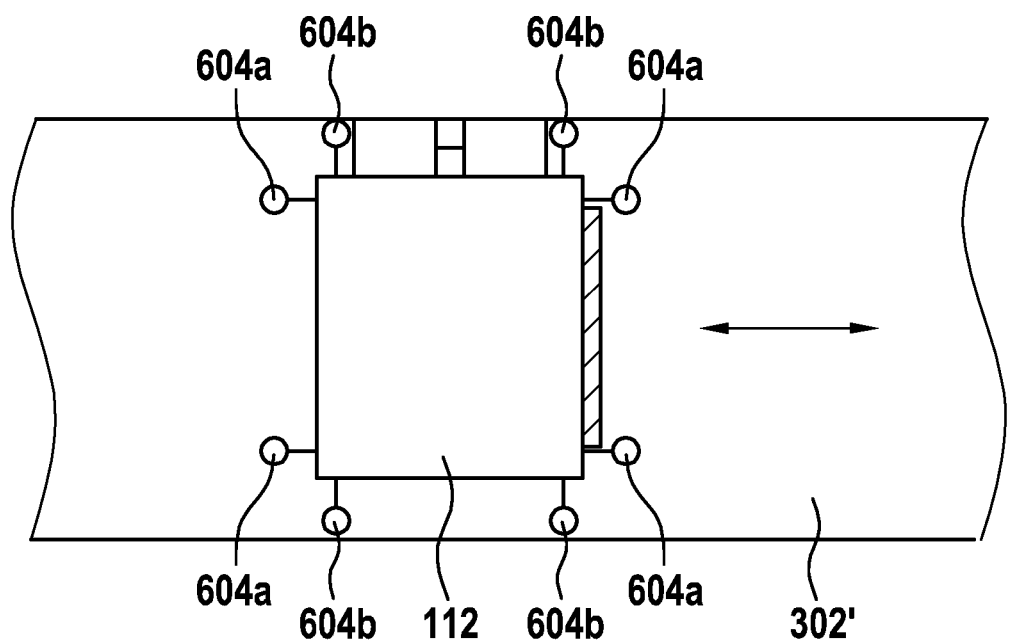

Now referring to FIG. 8, where an exemplary embodiment of an elevator system is shown where the elevator car operates in a horizontal elevator shaft 302'. In this embodiment, the elevator car 112 uses shaft support arrangement 604b to move along the horizontal elevator shaft 302' rather than shaft support arrangement 604a as in FIGS. 6 and 7. Likewise it is conceivable to have a combination of vertical elevator shaft 302 and horizontal elevator shaft 302', thereby allowing an elevator car 112 not only to travel vertically between floors but also horizontally on a floor.

It is to be understood that the invention is not limited to the embodiments described above, and various modifications and improvements may be made without deviating from the concepts described here. Any of the features described above and below may be used separately or in combination with any other features described herein, provided they are not mutually exclusive, and the disclosure extends to and includes all combinations and sub-combinations of one or more features described herein.

Finally, it should be noted that the term "comprising" not exclude other elements or steps, and that "a" or "one" does not exclude the plural. Elements that are described in relation to different types of embodiments can be combined. Reference signs in the claims shall not be construed as limiting the scope of a claim.

LIST OF REFERENCE NUMERALS 100 elevator system
112,a,b elevator car
114 counterweight
116 traction medium
118,120 pulley
122 traction sheave
124 elevator drive
126 encoder
128 brake
130 brake sensor
132 load weighing device
134 regenerative drive
136 converter
138 inverter
140 DC bus
142 capacitor
144 controller/processing element
146 elevator control
148 regenerative drive control
150 user interface
152,154 fixed attachment
156,a,b main power supply
200 pneumatic elevator system
202 compressor
204 gas reservoir
205 heating element
206a,b,c valve
208,a,b pressure feed
210 drive valve
212 drive valve control
224 pneumatic drive
234,a,b pneumatic arrangement
236 communication element
238 generator
240 pressure feed to generator
242 electric feed to controller
302,302' elevator shaft 304 wall
306 emergency gas reservoir/tank
308 inlet
402a,b compressor
404a,b gas reservoir
406a,b valve
408a,b,c,d,e,f pressure feed
410 elevator car door
412a,b,c floor landing door
414 elevator car door mechanism
416a,b,c floor landing door mechanism
418 traveling cable
502 wireless communication element
504 pneumatic arrangement control element
506 drive control element
508 network
510 management system
512 mobile device
514 wireless communication element
516 database management element
518 database
520 remote control element
522 cell tower
536 communication element
602 elevator pit
604a,b shaft support arrangement
606 pressure feed to gas reservoir
608a,b,c,d pressure feed
610 pit support

The invention claimed is:

1. An elevator system, comprising:
an elevator car;
an electric elevator drive adapted to move the elevator car in an elevator shaft,
the elevator system further comprising:
a gas reservoir,
wherein the gas reservoir is adapted for storing a pressurized gas,
wherein the gas reservoir is connected to a generator of the elevator system for powering at least a part of the elevator system,
wherein the generator is pneumatically actuated by the pressurized gas to generate electric energy,
wherein the generated electric energy powers the at least a part of the elevator system including at least a part of an elevator control,
a compressor for filling the gas reservoir with gas, and
an electric motor for actuating the compressor.

2. An elevator system, comprising:
an elevator car; and
an elevator drive adapted to move the elevator car in an elevator shaft,
the elevator system further comprising:
a gas reservoir,
wherein the gas reservoir is adapted for storing a pressurized gas,
wherein the gas reservoir is connected to a generator of the elevator system for powering at least a part of the elevator system,
wherein the generator is pneumatically actuated by the pressurized gas to generate electric energy,
wherein the generated electric energy powers the at least a part of the elevator system including at least a part of an elevator control,
a compressor for filling the gas reservoir with gas, and
a first electric motor and a second electric motor for actuating the compressor, wherein the first electric motor is a single phase and/or low power motor, and wherein the second electric motor is a multi-phase and/or high power motor.

3. The elevator system according to claim 2,
wherein the elevator drive is arranged at the elevator car, and
wherein the gas reservoir is arranged at the elevator car.

4. The elevator system according to claim 2,
wherein the elevator car is a self-supporting elevator car.

5. The elevator system according to claim 4,
wherein the elevator system comprises a plurality of self-supporting elevator cars adapted to be operable in parallel in the same elevator shaft.

6. The elevator system according to claim 2,
wherein the gas reservoir is fillable when the elevator car is at a floor landing and/or at a dedicated filling position within the elevator shaft.

7. The elevator system according to claim 2,
wherein the elevator system is arranged at an operation location,
wherein the operation location comprises a multi-purpose source of compressed air, and wherein the multi-purpose source of compressed air is adapted to provide pressurized gas to the elevator drive for actuating the elevator drive and/or to provide pressurized gas to the elevator system for filling the gas reservoir of the elevator system.

8. The elevator system according to claim 2, the elevator system further comprising at least one of:
a processing element that controls the filling of the gas reservoir by operating at least one electric motor of a compressor, and
a communication element adapted to receive instructions for operating the elevator system including the filling of the gas reservoir, and/or adapted to transmit operation data of the elevator system to a recipient device.

9. The elevator system according to claim 2,
wherein the elevator system is adapted to receive operating instructions from a communication entity for activating the filling of the gas reservoir via a communication element, wherein the instructions are indicative of or dependent on a current energy cost and/or a current energy availability.

10. The elevator system according to claim 2, the elevator system further comprising:
at least one elevator car door, and/or
at least one floor landing door,
wherein the at least one elevator car door and/or the at least one floor landing door is pneumatically operable.

11. The elevator system according to claim 10,
wherein the gas reservoir comprises a first gas reservoir, and wherein the elevator system comprises a second gas reservoir separate from the first gas reservoir and adapted for storing pressurized gas,
wherein the second gas reservoir is arranged at the elevator car, and
wherein the first gas reservoir is arranged to provide pressurized gas to at least one of the at least one elevator car door and/or the at least one floor landing door to allow pneumatically operating the least one elevator car door and/or the at least one floor landing door,
wherein the second gas reservoir is connectable to a pressure feed from the first gas reservoir for filling of the second gas reservoir and/or wherein a compressor comprising an electric motor is arranged at the elevator car for filling of the second gas reservoir.

12. The elevator system according to claim 2,
wherein the elevator system is adapted to prohibit elevator operation in case a gas pressure of the gas reservoir is below a defined threshold value, wherein the defined threshold value is indicative of a sufficient gas pressure to allow an evacuation of the elevator car.

13. The elevator system according to claim 2, the elevator system further comprising
an emergency gas reservoir for providing pressurized gas to the pneumatic drive for evacuation of the elevator car; and/or
an inlet adapted for connecting an external gas source for providing pressurized gas to the pneumatic drive for evacuation of the elevator car.

14. The elevator system according to claim 2,
wherein an external energy feed is exclusively connected to at least one electric motor of a compressor, and/or
wherein the elevator system comprises a heating element for heating the gas reservoir.

\* \* \* \* \*